US012730853B2

(12) United States Patent
Chudnovskiy et al.

(10) Patent No.: US 12,730,853 B2
(45) **Date of Patent: *Sep. 8, 2026**

(54) SYSTEMS AND METHODS FOR ANALYZING INFORMATION CONTENT

(71) Applicant: Majestic-12 Ltd, Birmingham (GB)

(72) Inventors: Alexey Chudnovskiy, Birmingham (GB); Steven Pitchford, Birmingham (GB)

(73) Assignee: Majestic-12 Ltd, Birmingham (GB)

( * ) Notice: Subject to any disclaimer, the term of this patent is extended or adjusted under 35 U.S.C. 154(b) by 331 days.

This patent is subject to a terminal disclaimer.

(21) Appl. No.: 18/089,191

(22) Filed: Dec. 27, 2022

(65) Prior Publication Data

US 2023/0237115 A1 Jul. 27, 2023

Related U.S. Application Data

(63) Continuation of application No. 16/988,446, filed on Aug. 7, 2020, now Pat. No. 11,537,680.

(30) Foreign Application Priority Data

Aug. 9, 2019 (GB) ..................................... 1911459

(51) Int. Cl.

| | |
|---|---|
| ***G06F 16/95*** | (2019.01) |
| ***G06F 16/955*** | (2019.01) |
| ***G06F 16/958*** | (2019.01) |

(52) U.S. Cl.

CPC ...... *G06F 16/9558* (2019.01); *G06F 16/9566* (2019.01); *G06F 16/972* (2019.01)

(58) Field of Classification Search

CPC .. G06F 40/143; G06F 16/287; G06F 16/9558; G06F 16/9566; G06F 16/972

See application file for complete search history.

(56) References Cited

U.S. PATENT DOCUMENTS

| | | | |
|---|---|---|---|
| 7,854,001 | B1 | 12/2010 | Chen |
| 7,921,097 | B1 | 4/2011 | Dandekar |

(Continued)

OTHER PUBLICATIONS

Marti Hearst, "Title Bars: Visualization of Term Distribution Information in Full Text Information Access", published: May 1995, pp. 1-8 (Year: 1995).*

(Continued)

*Primary Examiner* — Wilson W Tsui

(74) *Attorney, Agent, or Firm* — Loeb & Loeb LLP

(57) ABSTRACT

A system may determine information in relation to a link in an interlinked set of information content items. A memory may store a set of machine-readable instructions operable, when executed by a processor, to receive a link context associated with a link in an information content item of the interlinked set. The link context may include information from the information content item providing context for the link. Instructions may also be operable to identify one or more additional links present in the link context and determine a link density as the proportion of the link context which includes the or each additional link relative to the size of the link context, and/or determine a text density as the proportion of the link context which does not include the or each additional link relative to the size of the link context and/or count the or each additional link.

14 Claims, 17 Drawing Sheets

(56) References Cited

U.S. PATENT DOCUMENTS 8,056,132 B1 11/2011 Chang
8,438,642 B2 * 5/2013 Feng ..................... G06F 21/57 713/168
8,850,570 B1 9/2014 Ramzan
9,286,402 B2 3/2016 Chudnovskiy
9,679,048 B2 6/2017 Chudnovskiy
10,104,116 B2 10/2018 Chudnovskiy
10,404,739 B2 9/2019 Chudnovskiy
11,537,680 B2 12/2022 Chudnovskiy
2003/0167163 A1 * 9/2003 Glover .................. G06F 16/355 707/E17.108
2004/0174397 A1 * 9/2004 Cereghini .......... G06Q 30/0202 715/855
2005/0198268 A1 9/2005 Chandra
2005/0251496 A1 11/2005 Decoste
2005/0262428 A1 * 11/2005 Little .................. G06F 16/9535 715/201
2005/0289148 A1 12/2005 Dorner
2006/0004716 A1 1/2006 Hurst-Hiller
2006/0069667 A1 * 3/2006 Manasse ............. G06F 16/9538
2006/0184500 A1 8/2006 Najork
2007/0078939 A1 4/2007 Kallen
2008/0071773 A1 3/2008 Gross
2008/0091708 A1 4/2008 Caldwell
2008/0195631 A1 8/2008 Dom
2008/0215590 A1 9/2008 Thai
2008/0256065 A1 10/2008 Baxter
2010/0153544 A1 6/2010 Krassner
2011/0010365 A1 1/2011 Garcia
2011/0314152 A1 12/2011 Loder
2012/0102545 A1 4/2012 Carter
2012/0143792 A1 6/2012 Wang
2013/0185802 A1 7/2013 Tibeica
2014/0137250 A1 5/2014 Lee
2014/0149381 A1 5/2014 Chudnovskiy
2014/0310807 A1 10/2014 Qi
2015/0026151 A1 1/2015 Fujita
2015/0222649 A1 8/2015 Zeng
2015/0310098 A1 10/2015 Chudnovskiy
2015/0363688 A1 * 12/2015 Gao ...................... G06N 3/045 706/27
2016/0156659 A1 6/2016 Chudnovskiy
2017/0244751 A1 8/2017 Chudnovskiy
2018/0241769 A9 8/2018 Chudnovskiy
2021/0042380 A1 2/2021 Chudnovskiy

OTHER PUBLICATIONS

Donghua Pan et al: "Web Page Content Extraction Method Based on Link Density and Statistic", 2008 4th International Conference on Wireless Communications, Networking and Mobile Computing, WICOM' 08, Oct. 12-14, 2008, Oct. 1, 2008 (Oct. 1, 2008), pp. 1-4, XP055751433, DOI: 10.1109/WiCom.2008.2665, ISBN: 978-1-4244-2107-7.

Erdinc Uzun et al: "An effective and efficient Web content extractor for optimizing the crawling process: Software: Practice and Experience", Software-Practice and Experience, vol. 44, No. 10, Mar. 27, 2013 (Mar. 27, 2013), pp. 1181-1199, XP055751552, GB ISSN: 0038-0644, DOI: 10. 1002/spe.2195.

European Patent Office Communication pursuant to Article 94(3) EPC issued in App. No. EP20190087.5, dated Jun. 28, 2022, 7 pages.

European Search Report Issued in European Application No. 14195541.9, Oct. 5, 2015, 8 Pages.

European Search Report issued in European Application No. 20190087.5, Dec. 8, 2020 (9 pages).

Notice of Allowance dated Jun. 12, 2018 for U.S. Appl. No. 15/019,151 (pp. 1-7).

Notice of Allowance dated May 3, 2019 for U.S. Appl. No. 15/591,889 (pp. 1-7).

Office Action (Notice of Allowance and Fees Due (PTOL-85)) dated Aug. 17, 2022 for U.S. Appl. No. 16/988,446 (pp. 1-18).

Office Action dated Jan. 6, 2021 for U.S. Appl. No. 16/988,446 (pp. 1-31).

Office Action dated Jul. 22, 2021 for U.S. Appl. No. 16/988,446 (pp. 1-38).

Office Action dated Sep. 18, 2018 for U.S. Appl. No. 15/591,889 (pp. 1-22).

* cited by examiner

SYSTEMS AND METHODS FOR ANALYZING INFORMATION CONTENT

FIELD OF THE INVENTION

Embodiments of the present invention relate to systems and methods for analyzing information content.

BACKGROUND

There is a need to improve the categorization of information content and particularly websites.

Search engines and other Internet services analyse the content of websites in order to determine the subject matter of the website and the webpages of that website. This analysis may further include analysis of the popularity and importance of the website or webpage. Search engine providers may then use this analysis to determine how to respond to user search queries and, in particular, which websites and webpages should be listed in response to a query and the order or "ranking" of the search results.

As a result, website operators employ various mechanisms to improve their ranking in the search results. This may include relatively subtle efforts to improve a website or webpage ranking. In extreme examples an illegitimate website (e.g. selling illegal or counterfeit products, or wishing to spread malware) may attempt to trick analysis methods in order to be listed or to be listed more prominently in search results. Search engines and other services must adjust their processes in order to identify such efforts so that the results remain a true reflection of the potential relevance of the webpages to a search query, for example. There is a need, therefore, to provide better methods of analysis.

Commonly the analysis includes an investigation of the hyperlinks included in the webpage or website, and the hyperlinks to the webpage and website (i.e. hyperlinks from other webpages to the webpage or website being analysed).

As a result, website operators may attempt to create chains of hyperlinks including the webpage they want to improve in the rankings. In addition, webpages may be created with such hyperlinks for the primary purpose of improving the rankings (rather than a genuine attempt to link the webpages for legitimate reasons).

Conventionally, analysis has concentrated on the number of hyperlinks to a particular webpage or website, whether the webpages and websites including those links appear trustworthy, the subject matter of the webpage or website including the links, and the text of the hyperlink.

Various analysis techniques have been used in this regard. On example of how to categorise information content (such as webpages) can be found in U.S. Pat. No. 9,679,048 the entire content of which is herein incorporated by reference for all purposes.

There is a need to improve the analysis and provide additional information about the nature of the links to a particular website or webpage. The same is true of other information which may include links such as hyperlinks.

There is, in any event, a need to alleviate one or more problems associated with the prior art.

SUMMARY

Accordingly, an aspect provides a system for determining information in relation to a link in an interlinked set of information content items, the system comprising: a processor and a memory, wherein the memory stores a set of machine-readable instructions operable, when executed by the processor, to: receive a link context associated with a link in an information content item of the interlinked set of information content items, the link context including information from the information content item providing context for the link; analyse the link context to identify one or more additional links present in the link context; and determine a link density as the proportion of the link context which includes the or each additional link relative to the size of the link context, and/or determine a text density as the proportion of the link context which does not include the or each additional link relative to the size of the link context and/or count the or each additional link.

The information of the link context may include one or more characters.

The one or more characters may be characters which are adjacent the link.

The size of the link context may be predetermined and the same size of link context is used in the analysis of a plurality of links.

The size of the link context may be determined by separating the information content item in to a predetermined number of segments.

The memory may further store a set of machine-readable instructions operable, when executed by the processor, to: display a graphical representation of the link density and/or text density.

The memory may further store a set of machine-readable instructions operable, when executed by the processor, to: determine a distribution of link densities within the information content item.

The memory may further store a set of machine-readable instructions operable, when executed by the processor, to: compare the distribution of link densities with one or more predetermined distributions to categorise the information content item.

Another aspect provides a system for determining information in relation to a link in an interlinked set of information content items, the system comprising: a processor and a memory, wherein the memory stores a set of machine-readable instructions operable, when executed by the processor, to: identify an information content item of the set of information content items; access the identified information content item; locate a link within the information content item, the link being a link to another information content item or the same information content item of the interlinked set of information content items; extract a link context associated with the link and including information from the information content item which provides context for the link; and store the extracted link context in association with the link.

Another aspect provides a system for determining information in relation to a link in an interlinked set of information content items, the system comprising: a processor and a memory, wherein the memory stores a set of machine-readable instructions operable, when executed by the processor, to: identify an information content item of the set of information content items; access the identified information content item; locate a link within the information content item, the link being a link to another information content item or the same information content item of the interlinked set of information content items; extract a link context associated with the link and including information from the information content item which provides context for the link; identify one or more additional links within the link context; and determine a link density as the proportion of the link context which includes the or each additional link relative to the size of the link context, and/or determine a text density as the proportion of the link context which does not include the or each additional link relative to the size of the link context, and/or count the or each additional link in the link context.

Another aspect provides a system for determining information in relation to a link in an interlinked set of information content items, the system comprising: a processor and a memory, wherein the memory stores a set of machine-readable instructions operable, when executed by the processor, to: identify an information content item of the set of information content items; separate the identified information content item into a plurality of segments; and determine a link density for one or more the plurality of segments, the link density being a proportion of the segment which includes a link relative to the size of the segment, and/or determine a text density, the text density being a proportion of the segment which does not include a link relative to the size of the segment, and/or count the links in the segment.

Another aspect provides a method for determining information in relation to a link in an interlinked set of information content items, the method comprising: receiving a link context associated with a link in an information content item of the interlinked set of information content items, the link context including information from the information content item providing context for the link; analyzing the link context to identify one or more additional links present in the link context; and determining a link density as the proportion of the link context which includes the or each additional link relative to the size of the link context, and/or determining a text density as the proportion of the link context which does not include the or each additional link relative to the size of the link context, and/or counting the or each additional link.

Another aspect provides a method for determining information in relation to a link in an interlinked set of information content items, the method comprising: identifying an information content item of the set of information content items; accessing the identified information content item; locating a link within the information content item, the link being a link to another information content item or the same information content item of the interlinked set of information content items; extracting a link context associated with the link and including information from the information content item which provides context for the link; and storing the extracted link context in association with the link.

Another aspect provides a method for determining information in relation to a link in an interlinked set of information content items, the method comprising: identifying an information content item of the set of information content items; accessing the identified information content item; locating a link within the information content item, the link being a link to another information content item or the same information content item of the interlinked set of information content items; extracting a link context associated with the link and including information from the information content item which provides context for the link; identifying one or more additional links within the link context; and determining a link density as the proportion of the link context which includes the or each additional link relative to the size of the link context, and/or determine a text density as the proportion of the link context which does not include the or each additional link relative to the size of the link context, and/or counting the or each additional link.

Another aspect provides a method for determining information in relation to a link in an interlinked set of information content items, the method comprising: identifying an information content item of the set of information content items; separating the identified information content item into a plurality of segments; determining a link density for one or more the plurality of segments, the link density being a proportion of the segment which includes a link relative to the size of the segment, and/or or determine a text density, the text density being a proportion of the segment which does not include a link relative to the size of the segment, and/or count the links in the segment.

The memory may further store a set of machine-readable instructions operable, when executed by the processor, to: categorise one or more information content items using the text density and/or link density and/or link count.

The memory may further store a set of machine-readable instructions operable, when executed by the processor, to: present a graphical representation of the link density and/or text density, and/or link count The method may further include: categorizing one or more information content items using the text density and/or link density and/or link count.

The method may further include: presenting a graphical representation of the link density and/or text density and/or link count.

BRIEF DESCRIPTION OF THE DRAWINGS

Embodiments are described, by way of example only, with reference to the accompanying drawings, in which.

DETAILED DESCRIPTION

Figure 1:
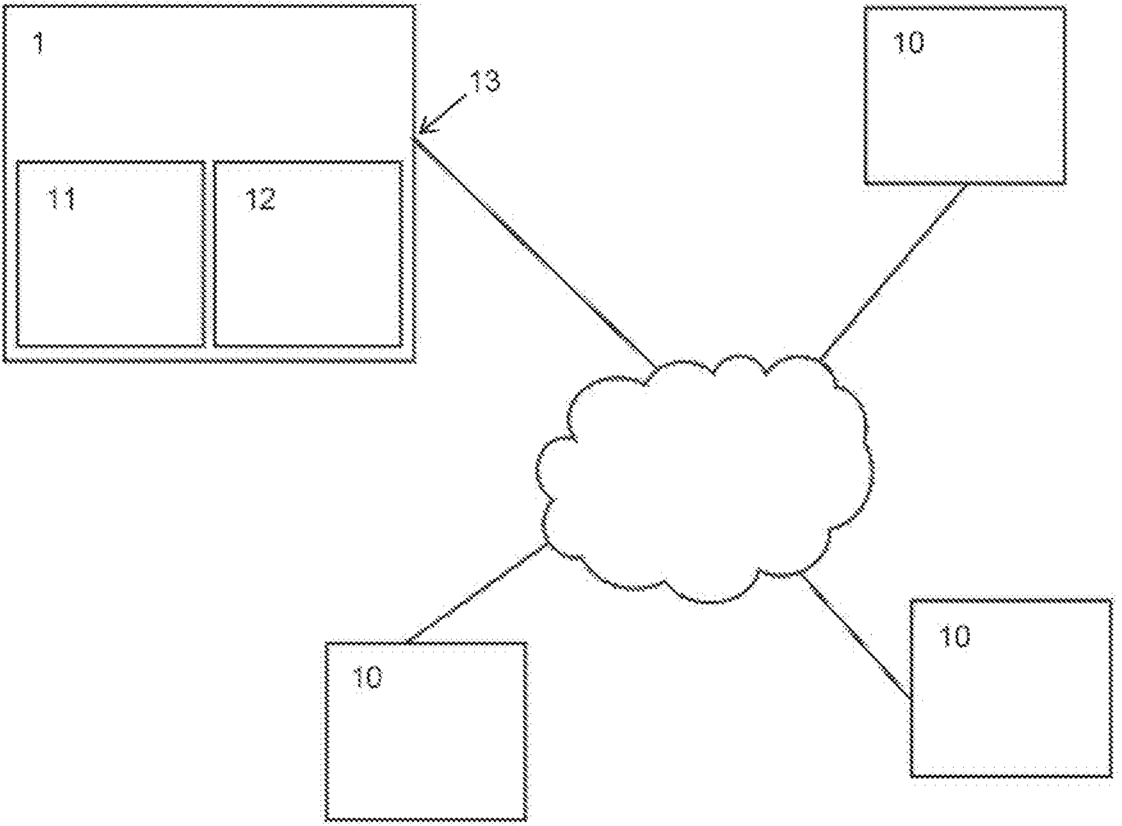
FIG. 1 shows a system according to some embodiments.

An embodiment of the present invention includes a computer system 1, see FIG. 1 for example.

The computer system 1 may include a processor 12 and a computer readable medium 11. The computer readable medium 11 is configured to store instructions for execution by the processor 12.

The processor 12 may, in some embodiments, include a number of sub-processors which may be configured to work together, e.g. in parallel with each other, to execute the instructions. The sub-processors may be geographically and/or physically separate from each other and may be communicatively coupled to enable coordinated execution of the instructions.

The computer readable medium may be any desired type or combination of volatile and/or non-volatile memory such as, for example, static random access memory (SRAM), dynamic random access memory (DRAM), flash memory, read-only memory (ROM), and/or a mass storage device (including, for example, an optical or magnetic storage device).

The computer system 1, including the processor 12 and computer readable medium 11, may be provided in the form of a server, a desktop computer, a laptop computer, or the like.

The computer system 1 is configured to access a body of information content 2. This body of information content 2 may be stored on the computer readable medium 11 or may be provided remotely and separately from the computer system 1. For example, the information content 2 may include at least a part of the World Wide Web or another resource accessible using the Internet.

Accordingly, the computer system 1 may include a network interface 13 which may be configured to enable the computer system 1 to communicate with another computing device or system through which the body of information content 2 may be accessed by the computer system 1. The network interface 13 may be configured to communicate, therefore, over a computer network (such as the Internet) with one or more other computing devices or systems which may each store at least part of the body of information content 2.

The computer system 1 may be further communicatively coupled to one or more further computing devices 10. The or each further computing device 10 may be communicatively coupled to the computer system 1 using a network (such as the Internet) and the network interface 13. The or each further computing device 10 may include at least one user computing device 10—which may be a desktop computer, a laptop computer, a mobile/cellular smart telephone, a tablet computer, a smart watch, or the like.

The roles of the computer system 1 and one or more further computing devices 10 will become apparent from the description herein.

The body of information content 2 to which the computer system 1 has access includes a plurality of information content items 3. The information content items 3 are interlinked by links 4 which provide connections between the information content items 3.

Figure 2:
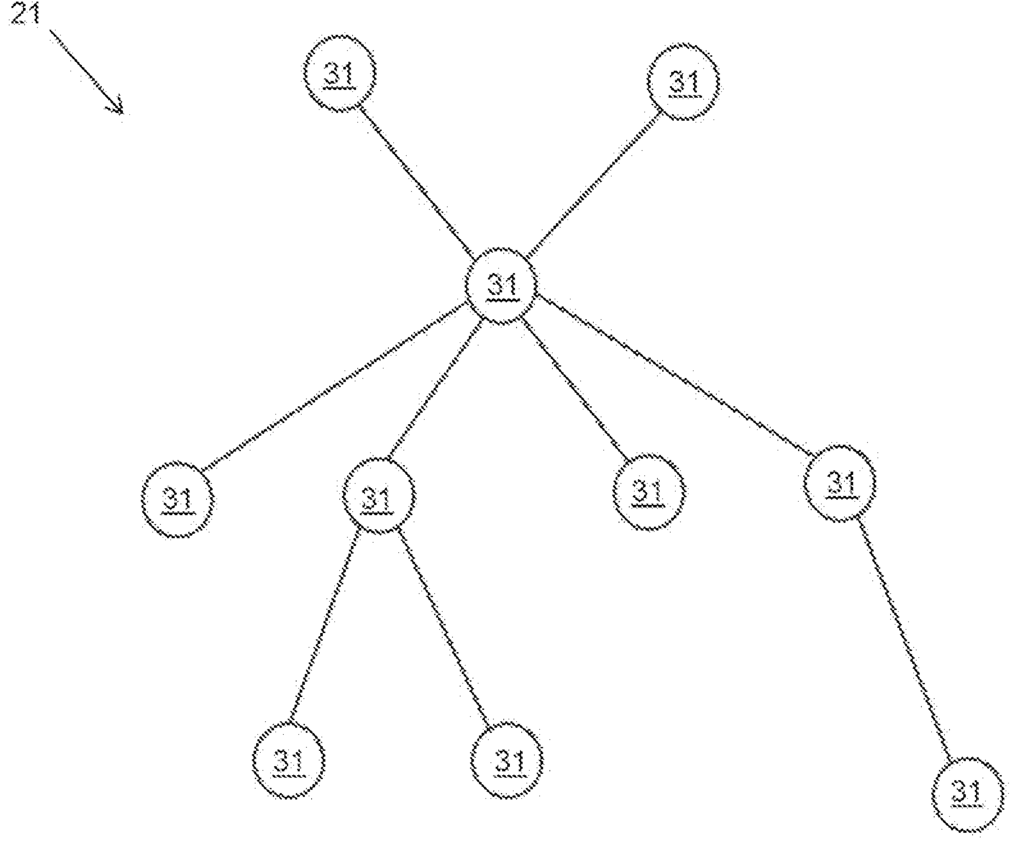
FIG. 2 shows a network of interlinked nodes according to some embodiments.

The information content items 3 may, therefore, be considered to be a network 21 of interlinked nodes 31 and the network 21 may as a whole form the body of information content 2 (see FIG. 2, for example).

The or each information content item 3 may include one or more documents (such as a hypertext or other markup language document, for example), images, image files, videos, video files, sounds, audio files, or other audio-visual content. The information content items 3 are distinct in the sense that they are separate information content items 3 but the information content items 3 are interconnected (or interlinked) by the links 4.

The body of information content 2 may include the World Wide Web or a part thereof. The information content items 3 may, therefore, include one or more webpages 311 or websites 3111. The links 4 may include respective hyperlinks. The or each link 4 may, therefore, be a reference to another information content item 3 or to a different part of the same information content item 3 or a reference to another information content item 3 in a group of information content items 3 (such as a website). In general herein, an information content item 3 including a link 4 will be referred to as the linking information content item 3 and the information content item 3 to which the link 4 is a reference will be referred to as the linked information content item 3 (which may be the same information content item 3 as the linking information content item 3).

The link 4 may include an address for the linked information content item 3 or part of the linked information content item 3. The address may or may not be visually presented to the user when the linking information content item 3 is presented to the user (e.g. in a browser application). The link 4 may, therefore, be represented by other text or another object (i.e. not the address) within the linking information content item 3 as presented to the user (e.g. in the browser application).

In some embodiments, the or each link 4 may be represented in the information content item 3, by text or an image or other audio-visual content. The information content items 3 may include other text or an image or other audio-visual content around or in proximity to the link 4. The content, in whatever form, around the link 4 within an information content item 3 will be referred to herein as the link context 41 of the link 4.

The link context 41 of the link 4 may include, for example, text located before the link 4, the text located after the link 4, the text located both before and after the link 4, one or more other information objects (such as an image or video) located before and/or after the link 4, and the like. References to "before" and "after" may be construed as relative positions with the information content item 3 based on the normal direction of reading of the language of that information content item 3 (e.g. from left to right in English or from right to left in Arabic). In some examples, "before" and "after" may be construed as always referring to one particular direction of reading irrespective of the language of the information content item 3. In some examples, references to "before" and "after" should be construed as references to before and after in terms of the logical storage of the data forming the information content item 3. Herein references to "before" and "after" the link 4 are intended to have the same meaning as references to "either side" of the link 4, for example.

In some embodiments, the link context 41 includes parts of the information content item 3 which are not directly presented to the user (e.g. in a browser)—such as formatting information in a markup language document. In some embodiments, the link context 41 only includes information which is normally presented to the user (e.g. in a browser).

Therefore, in some embodiments, the information content 2 is at least part of the World Wide Web, with the information content items 3 being webpages and the links 4 being hyperlinks between the webpages of the information content 2.

There are, of course, other examples of information content 2 and information content items 3—such as document management systems 2 including documents 3, for example.

The computer system 1 is configured to access the information content 2 and so the instructions include instructions which, when executed, cause the computer system 1 to access at least part of the information content 2 (including at least one information content item 3). These instructions may include instructions to contact a server and request a copy of the information content item 3, for example. In other embodiments, the instructions may be instructions to access a cached copy of the information content item 3 which was previously obtained (wherein the cached copy may be stored on the computer readable medium 11, for example).

The computer system 1 may be configured to receive and/or generate a map or other representation (visual or otherwise) of the information content 2. This map or other representation may be in the form of a network 21 of interlinked nodes 31. Each interlinked node 31 may include an address for an information content item 3 represented by that node 31. Furthermore, each interlinked node 31 may include the address of at least one other information content item 3 (e.g. a link 4). The at least one other information content item 3 may be an information content item 3 including a link 4 to or linked by the information content item 3 represented by the interlinked node 31. In some embodiments, each interlinked node 31 may include a reference (e.g. a link 4) to at least one other interlinked node 31, wherein that interlinked node 31 represents the at least one other information content item 3 (and includes an address for that at least one other information content item 3). As described herein an address of an information content item 3 may be a uniform resource locator (URL), for example.

In some embodiments, the map or other representation of the information content 2 may have been generated using a crawler application, such as a web crawler (or spider). In some embodiments, the crawler application may be stored on the computer readable medium 11 and may be configured to be executed by the processor 12. In some embodiments, there may be a plurality of crawler applications and these crawler applications may operate in unison (e.g. in parallel) in order to generate the map or other representation of the information content 2. The or each crawler application may be configured to crawl through the information content 2 recording (i.e. storing) the links 4 between the information content items 3. The or each crawler application may be configured to record (i.e. store) all or part of the link context 41 of each link 4, as described in more detail herein. The link context 41 may be stored in the map or other representation of the information content 2, for example. In some embodiments, the link context 41 may be stored separately and may be referenced by the map or other representation of the information content 2 such that the link context 41 for a link 4 may be accessed from the map or other representation.

In some embodiments, the link contexts 41 are stored in a separate database which may be accessible by the computer system 1. The separate database may be separate from the map or other representation of the information content 2, for example. The separate database may be stored on the computer readable medium 11. The database may include one or more entries which can be matched to the content (e.g. the interlinked nodes) of the map or representation of the information content 2.

Again, the additional information may be obtained through the execution by the processor 12 of instructions stored on the computer readable medium 11.

The map or other representation of the information content 2 may form an index of database. The map or other representation of the information content 2 may be an index of at least part of the World Wide Web.

The map or other representation of the information content 2 may include additional information regarding the subject matter to which the information content items 3 relate. This may include a category of the subject matter (i.e. a subject matter category). This may have been generated using the methods described in U.S. Pat. No. 9,679,048 or otherwise.

In some embodiments, the additional information is stored in a separate database and is accessible by the computer system 1 (which may be the same or a different separate database to that mentioned above). The separate database may be separate from the map or other representation of the information content 2, for example. The separate database may be stored on the computer readable medium 11. The database may include one or more entries which can be matched to the content (e.g. the interlinked nodes) of the map or representation of the information content 2.

Again, the additional information may be obtained through the execution by the processor 12 of instructions stored on the computer readable medium 11.

The computer system 1 may, therefore, be configured to generate a map or representation of the information content 2 (which may be at least part of the World Wide Web). The computer system 1 may, in any event, be configured to access such a map or representation which has been previously generated.

The computer system 1 may be further configured to analyse the information content items 3 and, in particular, to extract the link context 41 of one or more links 4 in the information content items 3. In some embodiments, the instructions may, when executed, cause the analysis of the information content items 3 to extract the link context 41.

In some embodiments, the extraction of the link context 41 may occur at the same time that the map or representation of the information content 2 is generated. In some embodiments, the map or representation of the information content 2 is used to target the information content items 3 for analysis to extract the link context 41 independently from generation of the map or representation of the information content 2 (e.g. at a later date or time).

The link context 41 may include information from one side or either side (i.e. both sides) of the link 4. As discussed above, this may include the extraction of text from the information content item 3 around the link 4.

The computer system 1 may be configured (and the instructions may, therefore, on execution cause the computer system 1) to analyse the link context 41 to determine useful information about, or associated with, the link 4.

For example, a link 4 which is one of many links 4 in close proximity to each other may indicate that the information content item 3 in which that link 4 is located is an index or directory of links 4, or that the information content item 3 in which that link 4 is located is a nefarious attempt to influence a ranking of the linked or linking information content item 3.

The text presented to the user (e.g. in a browser) around the link 4 may also reveal useful information about the link 4. For example, if the text is in a different language to the rest of the information content item 3 including the link 4 or is otherwise different in subject matter to a theme of the subject matter of the information content item 3 including the link 4, then this may also be an indicator that the link 4 is a nefarious attempt to influence a ranking of the linked or linking information content item 3.

These and other examples of operations of the computer system 1 (e.g. through the execution of the instructions) are described in more detail below. It will be appreciated that any combination of these techniques may be used in accordance with embodiments.

Link Density and Text Density

In some embodiments, the computer system 1 is configured (e.g. through execution of the instructions) to determine the number of other links 4 within the link context 41 for a link 4 of interest (e.g. the link 4 of interest may be a link 4 to an information content item 3 being considered (which may be a different information content item 3 to that in which the link 4 of interest is located)).

The number of other links 4 within the link context 41 may be used to determine a link density associated with the link 4 of interest (and so, by extension, associated with the information content item 3 being considered). The link density may be a numerical score representative of a relative proportion of the link context 41 which is another link 4 or part of another link 4 compared to the total size of the link context 41. In some embodiments, the proportion of the link context 41 may be determined in terms of the number of text characters, for example, of the link context 41 which can be identified as forming another link 4 or part thereof.

In some embodiments, the link density is a percentage or a fraction of the total link context 41 (which may not include the link 4 of interest itself) which is another link 4 or part thereof.

In some embodiments, the link density is a percentage or a fraction of the total number of words in the link context 41 (which may not include words/characters of the link 4 of interest itself) which are other links 4 or parts thereof.

In some embodiments, the link density is a percentage or a fraction of the total number of characters in the link context 41 (which may not include characters of the link 4 of interest itself) which are other links 4 or parts thereof.

In some embodiments, a part of a link context 41 which is not a word or character may be treated as a word or character for the purposes of determining the link density—e.g. an image may be considered to be a single character or word (or any given number of characters or words). In some embodiments, the information content 3 may be a markup language document and an image may, therefore, be indicated by a reference or address of the image for insertion into the document when displayed (e.g. in a browser). In some embodiments, the reference or address may be treated as a single character or word (or some predetermined number of characters or words) or may be separated into multiple parts (e.g. based on the structure of the address) and each part counted as a word or character or may be disregarded.

A text density may be the inverse of the link density. In other words, the text density may be a numerical score representative of a relative proportion of the link context 41 which is not another link 4 or part of another link 4 compared to the total size of the link context 41. In some embodiments, the proportions of the link context 41 may—similarly—be determined in terms of the number of text characters, for example, of the link context 41 which can be allocated to the two groups (i.e. to the group forming another link 4 or part thereof and to the group not forming another link 4 or part thereof)—such grouping may also be used in relation to determining the link density, for example.

In some embodiments, the text density is a percentage or a fraction of the total link context 41 (which may not include the link 4 of interest itself) which is not another link 4 or part thereof.

In some embodiments, the text density is a percentage or a fraction of the total number of words in the link context 41 (which may not include words/characters of the link 4 of interest itself) which are not other links 4 or parts thereof.

In some embodiments, the text density is a percentage or a fraction of the total number of characters in the link context 41 (which may not include characters of the link 4 of interest itself) which are not other links 4 or parts thereof.

In some embodiments, a part of a link context 41 which is not a word or character may be treated as a word or character for the purposes of determining the text density—e.g. an image may be considered to be a single character or word (or any given number of characters or words). In some embodiments, the information content 3 may be a markup language document and an image may, therefore, be indicated by a reference or address of the image for insertion into the document when displayed (e.g. in a browser). In some embodiments, the reference or address may be treated as a single character or word (or some predetermined number of characters or words) or may be separated into multiple parts (e.g. based on the structure of the address) and each part counted as a word or character or may be disregarded.

In some embodiments, parts of the link context 41 which are not text are discounted from the analysis to determine the link density or the text density or both.

In some embodiments, the computer system 1 is configured (e.g. through execution of the instructions) to compare the text density to a threshold text density. A text density over the threshold text density may be an indicator that the link 4 is a genuine link (in the sense that it is not likely an illegitimate link 4 whose primarily purpose is to, for example, alter search rankings). A text density below the threshold may be an indicator that the link 4 is an illegitimate link 4.

In some embodiments, links 4 which are identified as illegitimate links 4 may be discounted from one or more further analysis processes—for example, a process for categorizing the linked information item 3 (e.g. using the methods of U.S. Pat. No. 9,679,048 or otherwise) or for determining the linked information item's 3 relevance to a particular search query.

In some embodiments, links 4 which are identified as genuine links 4 are used in one or more further analysis processes—such as those mentioned above.

In some embodiments, links 4 which are identified as illegitimate links 4 may be recorded (e.g. in a blacklist stored on the computer readable medium 11) against (i.e. in relation to) the linking information content item 3. In some embodiments, other analysis processes (such as those mentioned above) may exclude some or all links 4 from a linking information content item 3 (or from a group of such linking information content items 3 such as a website) which is so recorded or for which there are more than a predetermined number of associated illegitimate links 4 (so indicating that the information content item 3 (or group) may, itself, be illegitimate).

In some embodiments, a link density may be determined in relation to links 4 to information content items 3 within a group (e.g. within the same website) and/or within the same information content item 3. Such a link density may be the internal link density, for example. In some embodiments, a link density may be determined in relation to links 4 to information content items which are outside of a group (e.g. within different websites) and/or not within the same information content item 3). Such a link density may be the external link density, for example. In some embodiments, both internal and external link densities may be determined.

Link Proximity Association

In some embodiments, the computer system 1 is configured (e.g. through execution of the instructions) to identify links 4 to a predetermined information content item 3 (or group of items 3—such as a website) for which particular information appears in the link context 41.

This may, for example, enable associations to be made between that predetermined information content item 3 (or group of items 3) and one or more other linking information content items 3 including the particular information.

So, for example, the predetermined information content item 3 may be a first business' website and the particular information may be the name of a competitor business.

In some such embodiments, the computer system 1 is configured (e.g. through execution of the instructions) to identify information content items 3 (such as webpages or websites) which include links to the business' website but which include the name of a competitor business in relatively close proximity (in terms of the number of characters for example) to the link 4 (i.e. within the link context 41).

In some embodiments, the computer system 1 is configured (e.g. through execution of the instructions) to apply a score to such proximity associations (the above being one such example) based on the distance (e.g. in number of characters or number of words) from the link 4 to the particular information.

In some embodiments, the score may be increased if there is more than one instance of the particular information in the link context 41.

This may enable the computer system 1 (e.g. through execution of the instructions) to identify one or more linking information content items 3 which may include, for example, a comparison of the products or services of a business to those of a competitor.

In some embodiments, the computer system 1 is configured (e.g. through execution of the instructions) to increase the score if the link context 41 similarly includes second particular information (different information to the particular information above) which is associated with the particular information (e.g. the name of another competitor business).

In some embodiments, the computer system 1 is configured (e.g. through execution of the instructions) to determine if there is link 4 to the competitor business or businesses in the link context 41. If there is no such link 4, but there is of course a link to the first business then this may indicate an affiliation of that linking information content item 3 to the first business. The same principle can be applied to brands, personal names, and other types of information (not just business names, for example).

In some embodiments an affiliation between information content items 3 may be determined by comparison of the number of links 4 between the two information content items in one or more link contexts 41 in each information content item 3 and/or through use of the aforementioned score. If the number of links 4 between the two information content items 3 or the score exceeds a threshold then an affiliation may be determined to exist between the two information content items 3. Similarly, if the number of links 4 in one or more of the link contexts 41 (collectively or individually) in an information content item 3 or the score exceeds a threshold then an affiliation may be determined to exist between the linked and linking information content items 3.

So, for example, the website (as an example of a group of information content items 3) of a US company may include a comparatively large number of links 4 to a website (as another example of a group of information content items 3) of a UK company. This may be an indication that the US and UK companies are part of the same group of companies. The same would be true for a webpage or other information content item 3.

Furthermore, it may be that a main corporation website or webpage has links 4 to websites or webpages associated with various subsidiaries (e.g. with each subsidiary representing a different geographical area or business type). The main corporation website or webpage page may, therefore, be a parent information content item 3 or group of items 3 with the subsidiary websites or webpages being child information content items 3 or groups of items 3. The parent to child relationship (i.e. affiliation) may be determined directly by virtue of the number of links 4 therebetween. In addition, the relationship (i.e. affiliation) between two child information content items 3 may be determined by virtue of a common parent information content item 3, for example. As such, the computer system 1 may be configured (e.g. by the execution of instructions) to determine directly or indirectly affiliations between information content items 3.

In some embodiments, the computer system 1 (e.g. through the execution of instructions) may be configured to assess the total number of links 4 in the link context 41, the nature of the linked information content items 3 (e.g. are there multiple links 4 to the same information content item 3 or to the same group of information content items 3 (such as a website)), the extent of intervening characters or words between the links 4, and/or whether the intervening characters are other links 4 (or parts thereof) or other objects (such as an image or video) or text (which is not a link 4 or part thereof). The assessment may include determining the number of intervening characters including or discounting text or an object which represents the link 4 when that link 4 is presented to the user—i.e. the anchor for the link 4.

Affiliations of these types may be recorded in relation to the linking information content item 3 and/or the linked information content item 3 by the computer system 1 (e.g. through the execution of instructions). As a result, one or more categories of subject matter associated with either the linked or the linking information content item 3 may be further associated with one or more affiliated information content items 3.

In some embodiments, one or more analysis processes may take into account the affiliation and may, for example, disregard or reduce the influence of links between affiliated information content items 3. In some embodiments, links 4 between affiliated information content items 3 may be treated in one or more analysis processes as if they were links 4 within the same information content item 3 or group of items 3 (such as a website)—i.e. as an internal link.

In some embodiments, affiliations between information content items 3 are recorded in a database which may be stored on the computer readable medium 11, for example.

In some embodiments, the identification of affiliated information content items 3 may be an indication of an increased risk of at least one of the information content items 3 being illegitimate and this may be recorded in a database on, for example, the computer readable medium 11.

In some embodiments, the identification of affiliated information content items 3 may be an indication of common control over the information content items 3. Subsequent analysis processes may include, for example, identification of the owner or operators of the information content items 3 (e.g. through the use of databases listing owners or operators, or by assessing the content of the information content items 3 to identify name and/or address information—e.g. scraping the information content items 3). The analysis processes may then include associating those owners and operators of the information content items 3 with each other. Such information may be used to map out a business group structure—e.g. the structure of a business and its subsidiaries. Such information may be used to identify indicators of common beneficial ownership for the purposes of performing anti-money laundering checks, for example—e.g. in assessing risk factors associated with property transactions between businesses in terms of potential money laundering offences.

Non-Textual Content

In some embodiments, the computer system 1 is configured (e.g. through execution of the instructions) to identify the presence of one or more non-textual objects (such as an image, video, or the like) in the link context 41 for a particular link 4.

In some embodiments, the computer system 1 is configured (e.g. through execution of the instructions) to determine whether the number of such objects exceeds a threshold number of objects. In some embodiments, the computer system 1 is configured (e.g. through execution of the instructions) to determine whether the link 4 is surrounded on either side by such objects. If either or both of these criteria is met then this may be recorded (by the computer system 1) in relation to the link 4, the linking information content item 3, or the linked information content item 3 (e.g. in a database stored on the computer readable medium 11).

It will be noted that, in some embodiments, the information content 3 may be a markup language document and an image may, therefore, be indicated by a reference or address of the image for insertion into the document when displayed (e.g. in a browser). Therefore, the computer system 1 may be configured to determine from the reference or address whether the object is an object of the type of interest (e.g. an image, video, or the like). This may include, for example, looking at a file extension associated with the address or reference and comparing the file extension with a list of file extensions used for objects of the type of interest (e.g. an image, video, or the like). An example file extension for an image file may be ".jpeg" or ".jpg" or ".gif" or ".png", or ".svg", for example.

In some embodiments, the meeting of one or both of the above criteria may be an indicator that the linking information content item 3 is illegitimate and this may be recorded in relation to the link 4, the linking information content item 3, and/or the linked information content item 3 (e.g. in a database stored, for example, on the computer readable medium 11).

In some embodiments, the meeting of one or both of the above criteria may be an indicator that the linking information content item 3 is a directory or catalogue of such objects and this may be recorded in a database stored, for example, on the computer readable medium 11. Further analysis processes may include extraction of one or more objects and comparison, for example, to a record of objects in which copyright is held with a view to identifying unauthorised copies of a copyrighted object being made available through a directory or catalogue of such objects. In other examples, the extracted object or objects are analysed to identify the subject matter of the objects (e.g. a photograph of a building or person or structure or item) and this information may then be recorded in a database stored, for example, on the computer readable medium 11—so identifying the linking and/or linked information content item 3 as associated with the subject matter of the extracted object or objects. This information may be used to categorise the linking or linked information content item 3 and the categorization may be so stored in associated with the linking or linked information content item 3—e.g. in a database which may be stored on the computer readable medium.

An artificial intelligence or machine learning engine may be used to perform the aforementioned comparison and/or identification. Such an engine may form part of embodiments and may be represented instructions for execution by the computer system 1 (e.g. instructions which may be stored on the computer readable medium 11). Accordingly, the computer system 1 may be configured (through the execution of the instructions, for example) to perform the comparison and/or identification processes.

Structural Context

In some embodiments, the computer system 1 is configured (e.g. through execution of the instructions) to assess structural information about the link context 41. In particular, the computer system 1 may be configured to identify if the link context 41 includes at least part of a table of information or if there is an informational pattern to the information in the link context 41.

In some embodiments, in which the linking information content item 3 is a markup language document, the computer system 1 may be configured (e.g. through execution of the instructions) to identify one or more indicators of the presence of a table. This may include the frequent use, in the link context 41, of a separator symbol used in that markup language—such as the "pipe" symbol "|" or a marker used to define the representation of at least part of a table (such as "<td>" or "<tr>" or "<th>" or "<table>" or "</td>" or "</tr>" or "</th>"). Tabulated information in the linking information content item 3 may be an indicator that the link 4 associated with the link context 41 is part of a directory or list of links 4, for example.

In some embodiments, the computer system 1 is configured (e.g. through execution of the instructions) to identify patterns in the information in the link context 41. This may be achieved by identifying other links 4 in the link context 41 and then determining whether there are any patterns in the information between the identified links 4. For example, the computer system 1 may be provided with a list of personal and/or business names, and may be configured to compare the information between links 4 (and/or text associated with the links 4 themselves) with the list of names. Regular or semi-regular patterns in the presence of names may be an indicator that the linking information content item 3 is a directory of businesses and/or people, for example.

Similarly, in some embodiments, the computer system 1 may be provided with a list of place names (e.g. geographical locations), and may be configured to compare the information between links 4 (and/or text associated with the links 4 themselves) with the list of place names. Regular or semi-regular patterns in the presence of place names may be an indicator that the linking information content item 3 is a directory of businesses and/or people, for example. Instead of, or any addition to, place names, other location identifiers may be used such as postal codes (i.e. Zip Codes), telephone area codes, and/or the like.

The identification of a linking information content item 3 which may be a directory (or other list) may be recorded in association with the link 4, the linking information content item 3, and/or the linked information content item 3 in a database stored on, for example, the computer readable medium 11. This information may be used in one or more analysis processes—e.g. reducing the impact or influence of a link 4 from an information content item 3 which is identified as a directory or other list of other information content items 3 when categorizing the linked information content item 3.

In some embodiments, directories listing competitor businesses may be identified (by the computer system 1 determining links from linking information content items 3 so identified to linked information content items 3 associated with the competitor business, for example). This may then be used to seek, for example, the addition of another business to the linking information content item 3 or to assess the marketing activities of the competitor business.

Textual Meaning

In some embodiments, the computer system 1 is configured (e.g. through execution of the instructions) to analyse the link context 41 to determine the meaning or subject of at least part of the link context 41.

Accordingly, the computer system 1 may be configured to identify one or more words within text forming at least part of the link context 41. The computer system 1 may then use the one or more words to categorise the subject matter associated with the link context 41.

For example, one or more nouns may be identified (such as "network", "computer" and "internet"). The computer system 1 may have access to a directory of such words which is categorised by subject matter; the computer system 1 may be configured to identify at least one category of subject matter associated with the one or more identified words (and so may identify "network", "computer" and "internet" as relating to "IT Systems", for example). This categorization may then be stored in association with the link 4, the linking information content item 3, and/or the linked information content item 3—e.g. in a database which may be stored on the computer readable medium 11.

In some embodiments, the computer system 1 may be further configured to identify the likelihood of two different categories of subject matter being identified within the link context 41. For example, if the computer system 1 identified subject matter in the link context 41 relating to two very disparate subject matter areas (such as "intensive beef farming" and "plastics manufacture"), then the computer system 1 may be configured to determine that the linking and/or linked information content item 3 may be illegitimate.

In order to determine the likelihood of two different subject matter areas being associated with each other, the computer system 1 may have access to a directory of words arranged in a hierarchical subject matter structure. For example, words associated with "intensive beef farming" may be located in a "non-arable farming" category (which may include other non-arable forms of farming) and this may in turn be located in a "farming" category (along with arable farming). The computer system 1 may be configured to identify a common parent category for two different subject matter categories identified and this may be sufficient for the computer system 1 to identify the two subject matter categories as being sufficiently close to each other (e.g. to avoid identification as illegitimate). The computer system 1 may be configured to determine the number of child categories passed through to reach the common parent category and this number may be compared to a threshold (if the number exceeds the threshold then the computer system 1 may determine that the linking and/or linked information content item 3 is illegitimate). Some categories may be identified as in common association to all other categories (for example, categories associated with the Internet, websites, and the like could be legitimately associated with any other category—from farming to space exploration).

In some embodiments, the computer system 1 is configured (e.g. through execution of the instructions) to identify the grammatical construction of the link context 41 (or at least of any text of the link context 41). In particular, the computer system 1 may be configured to identify one more sentences or partial sentences within the link context 41. If the computer system 1 cannot identify a valid grammatical construction in the link context 41 (i.e. a construction following normal grammatical rules), then the computer system 1 may be configured to identify the linking or linked information content item 3 as illegitimate. In some embodiments, this determination by the computer system 1 may be combined with the analysis of the structure of the link context 41 described above (e.g. whether the link context 41 is in the form of a table of information) and if the link context 41 has no valid grammatical construct and is not in some structural arrangement (such as a table), then the linking or linked information content item 3 may be indicated as illegitimate.

As with other examples, the indication that a linked or linking information content item 3 may be illegitimate, may be stored in association with the link 4, the linked information content item 3, or the linking information content item 3, in a database which may be stored on the computer readable medium 11.

Language and Language Mismatch

In some embodiments, the computer system 1 is configured (e.g. through execution of the instructions) to analyse the link context 41 to determine one or more languages used in the link context 41.

This may be achieved by the computer system 1 identifying one or more words within the link context 41 and comparing the words to a list of words associated with different languages, for example. In some embodiments, the computer system 1 is configured to send the link context 41 or a part thereof to a third party service for language identification.

The computer system 1 may be configured to access a directory of languages associated with particular information content items 3 and/or to generate an indication of the likely language of the information content item 3 as a whole.

If there is a mismatch of languages within the link context (i.e. more than one or more than a predetermined number of languages are used) or a mismatch between the language of the link context 41 and the language associated with the linking information content item 3, then the computer system 1 may be configured to indicate that the linking and/or linked information content item 3 is illegitimate. Again, in some embodiments, this may be combined with the analysis of the structure of the link context 41 described above (e.g. whether the link context 41 is in the form of a table of information) and if there is a language mismatch and the link context is not in some structural arrangement (such as a table), then the linking or linked information content item 3 may be indicated as illegitimate (this may help to avoid misidentifying a dictionary or other translation tool information content item 3 as illegitimate).

As with other examples, the indication that a linked or linking information content item 3 may be illegitimate, may be stored in association with the link 4, the linked information content item 3, or the linking information content item 3, in a database which may be stored on the computer readable medium 11.

Social Media

In some embodiments, the information content items 3 may be social media items for example. These may be all within one social media network (e.g. Facebook® or Twitter® or LinkedIn®) or could be from a mixture of different social media networks. Such information content items 3 may be linked 4 to a particular user (e.g. the author) or linked 4 to more than one user (e.g. to some re-posting or commenting on or liking the information content item 3). Such information content items 3 may also or alternatively include one or more tags which identify them as being of a particular category or of interest to a particular group of other users.

The computer system 1 (e.g. through the execution of instructions) may be configured to analyse information content items 3 in the form of social media items in much the same manner as described herein in relation to other forms of information content item 3. In particular, social media items (i.e. social media information content items 3) may be accessible as webpages, for example. The structure of a social media information content item 3 may be predetermined and/or learnt by the computer system 1. As such, the computer system 1 may be configure to isolate individual posts in a social media information content item 3 and may be configured to analyse each post individually or a as a group—with each post or group being an information content item 3 within the meaning used herein.

The computer system 1 may be configured to access categorised social media information content items 3, for example (e.g. categorised using the processes disclosed in U.S. Pat. No. 9,679,048, which may be supplemented by additional categorization information a described herein).

Accordingly, in some embodiments, the computer system 1 may be configured to identify one or more links 4 within a social media information content item 3 and to use one or more of the processes described herein.

In this instance, however, linked social media information content items 3 may be associated with another user. Therefore, affiliations between users may be determined (in the same manner as described elsewhere herein).

Using the categorization information associated with the social media information content items 3, the computer system 1 (e.g. through the execution of instructions) may be configured to identify one or more users who are experts on a particular subject. The relative expertise of a user on a subject may be determined by reference to the number of linking social media information content items 3, for example, and the assessment of the number of such links may use the processes described herein for discounting illegitimate links, for example.

In some embodiments, the computer system 1 may aid topic categorization by analysis of the text representing one or more links 4 is a social media information content item 3. Such text may be in the form of a tag, for example, intended to aid searching.

Such aided categorization may assist in determining key influential proponent users of opposing views in a debate, for example. In particular, two key but opposing proponent users may include large numbers of links 4 between their respective social media information content items 3. Such information content items 3 may also include common "parent" links 4 concerning the issue being debated but also links 4 associated with their particular position on the debate (whether these be tags or links 4 to information content items which are from supporters of that particular view point).

The link context 41 for links 4 in such social media information content items 3 may also indicate—in light of its meaning following textual meaning analysis—a particular category or sub-category (e.g. view point) associated with that social media information content item 3 and so also the associated user.

The link context 41 may also be used—in particular, the link density or text density—to distinguish between different uses of links 4 in a social media information content item 3. For example, a comment on another information content item 3 may include a link 4 to that information content item 3 at the beginning of text or in the middle of that text. However, tags used to identify a topic of the social media information content item 3 may be presented at the end of the text and in close proximity to other such tags (which may all be links 4).

Information collated from social media information content items 3 may be associated with users and stored in a database searchable by user.

In some embodiments analysis of social media information content items 3 may be limited to those information content items 3 which can be openly accessed on a particular computer network (such as the Internet). In other words, such analysis may be limited to publically available social media information content items 3.

Link Context Storage and Size

In accordance with some embodiments, the computer system 1 is configured (e.g. through the execution of the instructions) to extract the link context 41 from an information content item 3. The link context 41 may be stored for further analysis (and/or to provide an audit trail for analysis which is performed) on the computer readable medium 11 or otherwise so that it may be accessed by the computer system 1.

The link contexts 41 for various information content items 3 may be stored in a database in association with one or more of the links 4, the linking information content items 3, and the linked information content items 3.

In some embodiments, the link contexts 41 are not themselves stored but references to the link contexts 41 are stored—i.e. addresses indicating where the link context 41 was obtained from and the portion of the linking information content item 3 which formed the link context 41. Such embodiments may include embodiments in which the information content 2 is unlikely to change over time, for example.

In relation to images and other non-textual objects within the link context 41, the computer system 1 may store—in some embodiments—a copy of the link non-textual object or may store the address or other reference to the non-textual object.

As will be appreciated, the size of the link context 41 has an impact on the analysis which is performed by the computer system 1 in accordance with some embodiments.

In some embodiments, the link context 41 may include one or more of: a predetermined number of characters after a link 4; a predetermined number of characters before a link 4; a predetermined number of characters to either side of a link 4; a predetermined number of words or objects after a link 4; a predetermined number of words or objects before a link 4; and a predetermined number of words or objects to either side of a link 4.

In some embodiments, the predetermined number of characters is 10-200 characters. In some embodiments, the predetermined number of characters is 20-100 characters. In some embodiments, the predetermined number of characters is 75-150 characters. In some embodiments, the predetermined number of characters is 100-150 characters. In some embodiments, the predetermined number of characters is 100 characters. In some embodiments, the predetermined number of characters is less than 100 characters or less than 200 characters.

In some embodiments, the link context 41 does not include the link 4 itself (or any text or object representing the link 4 in the information content item 3 as presented to a user (e.g. in a browser)). The link context 41 may include the text of the link 4 itself. The link context 41 may be centred on the link 4 (i.e. extending to either side of the link 4 evenly or substantially evenly. In some embodiments, the link context 41 extends forwardly or backwardly from the link 4 (i.e. in one direction).

In some embodiments, instead of a predetermined number of characters or words, a dynamic number of characters or words is used (and/or a dynamic direction of extension of the link context 41 with respect to the link 4 may be used).

The dynamic number of characters or words (and/or dynamic direction) may be determined in association with that particular link 4, or that particular linking information content item 3, or that particular linked information content item 3.

In some embodiments, the computer system 1 (e.g. through the execution of instructions) is configured to determine the dynamic number of characters or words (and/or dynamic direction) based on an initial analysis of the words or characters in the immediate vicinity of the link 4.

The computer system 1 may, therefore, be configured to expand the link context 4 around (and/or to a side of) the link 4 in stages, performing initial analysis on the link context 4 at each stage.

The initial analysis may include a count of the number of other links 4 identified, a count of the number of words in the link context 41, and/or a count of the number of non-textual objects (such as images) in the link context 41.

In some embodiments, each of these criteria may be associated with its own threshold—so a threshold number of links 4, a threshold number of words, and a threshold number of non-textual objects.

If the number counted exceeds the respective threshold then further expansion of the link context 41 may be stopped and the final size (and/or direction) of the link context 41 may be set.

More than one of these criteria may be applied during the dynamic determining of the size (and/or direction) of the link context 41—such that the first threshold to be reached may cause the expansion of the link context 41 to be stopped (and/or stopped in a particular direction).

Accordingly, if there is a large number of links 4 in the link context 41 (and no words), then further expansion of the link context 41 may serve little additional benefit. If there is a large number of words in the link context 4 (and no words), then further expansion of the link context 41 may also serve little additional benefit. If there is a large number of other objects in the link context 41 then, again, expanding the link context 41 further may be of little additional benefit.

In some embodiments, there may be a minimum link context 41 size and this may be set according to the number of characters and/or words in the link context 41. The minimum may be, for example, at least 5 characters, at least 10 characters, at least 25 characters, at least 50 characters, or at least 75 characters. The minimum may be, for example, at least 1 word, at least 5 words, at least 10 words, or at least 25 words.

The minimum may be used in combination with one or more of the aforementioned threshold criteria such that the minimum link context 41 size must be achieved before the threshold criteria is permitted to stop expansion of the link context 41 (or stop the expansion in a particular direction).

The link context 41 may be expanded one character at a time, or by another predetermined number of characters in each step (e.g. 5 or 10 characters). The link context 41 expansion may be based on separator characters within the information content item 3 (such as a space or a punctuation mark) and so be may an expansion of one or a group of words at a time.

The link context 41 may be stored (e.g. on the computer readable medium) once expansion of the link context 41 has stopped.

Providing a minimum link context 41 size may more readily permit other analysis to be performed on the link context 41—such as an assessment of the language used in the link context 41. Providing a dynamically sized (and/or directionally extended) link context 41 may, however, reduce the storage needed to store all of the link context 41 information.

The expansion of the link context 41 may be symmetrical about the link 4 or may be an expansion in one particular direction (i.e. forwards or backwards) with respect to the link 4. In some embodiments, the expansion may be in both directions but may be at a greater rate in one of the directions. In some embodiments, expansion in a particular direction may be stopped if the end of the information content item 3 is reached. In some such instances, the rate or extent of expansion in the other direction—i.e. away from the end of the information content item 3—is increased.

The obtaining and storage of link contexts 41 may be performed by one or more crawler applications as described herein (which may distinct from programs which, when executed, perform analysis of the link contexts 41).

User Interface

Figure 3:
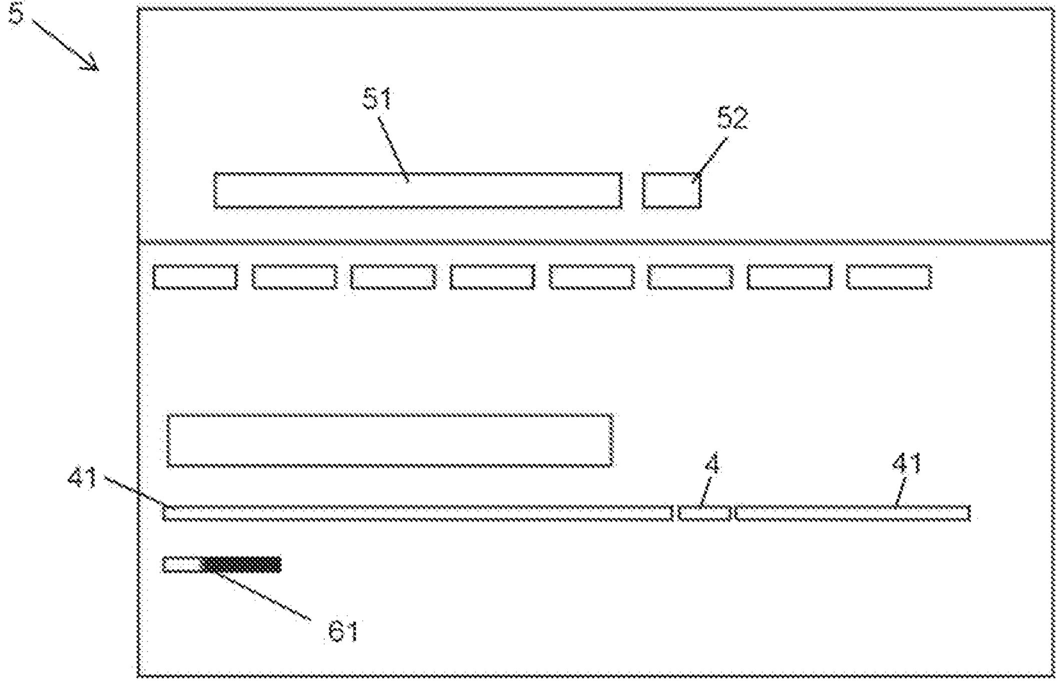
FIG. 3 shows a graphical user interface according to some embodiments.

In some embodiments, a graphical user interface 5 is provided (see FIG. 3 for example) which presents to a user information about the information content items 3 and the results of the operation of embodiments as described herein.

The graphical user interface 5 may be generated by the computer system 1 and served to one or more further computing devices 10. The graphical user interface 5 may be configured to receive one or more inputs from a user. The one or more inputs may include a request for further or different information, for example, regarding the information content 2.

In some embodiments, the graphical user interface 5 includes a search field 51 in which a user may enter (using a further computing device 10) the address for an information content item 3 of interest. This may be a domain name or a website address (e.g. URL) or a webpage address (e.g. a URL), for example.

The content of the search field 51 (i.e. a search criteria in the form of a target information content item 3) may be sent to the computer system 1 on actuation of a button 52 of the graphical user interface 5, for example. The computer system 1 may then return results associated with the search criteria.

The results may include a listing of all of the information content items 3 linked to by the target information content item 3. The results may include a listing of all of the information content items 3 linking to the target information content items 3.

Each listed information content item 3 may be indicated by summary information. This summary information may include the link context 41 or a part thereof, for example. In some embodiments, the summary information includes a location of the listed information content item 3 (such as a URL). The summary information may include a title for the listed information content item 3 (which may be a title which has been extracted from the listed information content item 3). The summary information may include one or more categories of subject matter associated with each listed information content item 3 (e.g. as determined using the methods described in U.S. Pat. No. 9,679,048, which may be supplemented by additional categorization information a described herein). The summary information may include information about the or each link 4 between the listed information content items 3 and the target information content item 3 (such as the number of links 4 between the two information content items 3).

The summary information may include the results of one or more of the analysis processes described herein. For example, the number of other links 4 in the link context 41 for the link 4 between the two information content items 3, and/or the link density, and/or the text density, for example).

A graphical representation of the link density and/or the text density may be provided and this may be included in the summary information. For example, the graphical representation may comprise a bar chart 61 to represent the numerical value of the link density and/or text density.

In some embodiments, the listed information content items 3 can be listed in order according to their respective link density or text density numerical values.

The graphical user interface may include one or more selectable options which may allow the user to select the filters on the results presented—i.e. on the listed information content items 3. The filter may include a language—such that information content items 3 of a particular language can be excluded from the listed information content items 3 and/or such that information content items 3 not in a particular language are excluded from the listed information content items 3. The language of an information content item 3 may be determined based on a language of any textual content of the link context 41 causing the listing of the information content item 3.

The one or more selectable options may include an option to select a topic of interest and the results may be limited according to the topic of the information of the information content item 3 and this topic may be determined by analysis of the link context 41 and/or by the categories of subject matter indicated for the linking information content item 3 (e.g. as determined using the method of U.S. Pat. No. 9,679,048, which may be supplemented by additional categorization information a described herein).

Other Uses

As will be appreciated, embodiments may be used for various purposes and some of these have been mentioned above.

The aforementioned graphical user interface 5 may be used to perform various investigations into the information content 2 and the network 21 of interlinked nodes 31 (i.e. the interlinked information content items 3). Such investigation may be at least partially automated by the computer system 1.

Embodiments may be used, for example, to identify one or more illegitimate information content items 3. As used herein, an illegitimate or nefarious information content item 3 is an information content item 3 which is likely to skew one or more further analysis processes in relation to the information content 2—for example search rankings. In some instances, the illegitimate or nefarious information content item 3 may include malware or may encourage illegal behavior. As such, a particular illegitimate or nefarious information content item 3 may be associated (or affiliated) with one or more other illegitimate or nefarious information content items 3 and the reasons for the identification as illegitimate or nefarious may be different between linked information content items 3. In some instances, an illegitimate or nefarious information content item 3 may simply be an otherwise legitimate information content item 3 but one which will skew the intended purpose of analysis of the information content 2. For example, it may be desired to exclude directories of businesses or individuals from further analysis and so such directories may be classed as illegitimate or nefarious.

An information content item 3 which is identified as illegitimate or nefarious may be excluded (i.e. discounted or disregarded) from further analysis processes, and/or a source of the illegitimate or nefarious information item(s) 3 may be blacklisted by one or more computer programs. For example, an email computer program may be configured to compare the origin of one or more emails with the sources of illegitimate or nefarious information content item(s) 3 listed in a blacklist. Sources of such information content items 3 may be identified using a domain name of in an address of the location of the information content item 3 for example. The email computer program may be configured to block one or more emails identified as originating from such a source, or to quarantine one or more such emails, or to apply additional security processes to one or more such emails (such as additional checks for malware).

The computer system 1 may be configured to update the blacklist on identification of one or more information content items 3 which are illegitimate or nefarious. The blacklist may be centrally stored and accessed by one or more remote further computing devices 10 (e.g. over a network such as the Internet) or may be distributed to the one or more further computing devices 10. The blacklist may be used for other purposes by the one or more further computing devices 10 (i.e. other than for email security). For example, a browser application operating on a further computing device 10 may use the blacklist to prohibit or restrict access to the listed information content items 3.

In some embodiments, the computer system 1 is configured to identify one or more information content items 3 which may have been altered or corrupted—e.g. which may have been hacked—in order to include one or more links 4 to illegitimate or nefarious information content items 3. Such an information content item 3 may otherwise be a legitimate information content item 3 but may include a link 4 to an illegitimate or nefarious information content item 3 (or even a link 4 to another altered or corrupted information content items 3 such that two or more altered or corrupted information content items 3 form a chain of interlinked information content items 3 which include, within the chain, an illegitimate or nefarious information content item 3). Analysis of the link context 41 may provide an indication of whether its presence in the information content item 3 is the result of alteration or corruption of the information content item 3. In addition, other information about the likely legitimacy of the information content item 3 may also be used by the computer system 1 to determine whether an alteration or corruption is likely to have occurred. For example, an information content item 3 which otherwise appears to be legitimate but which includes such a link 4 may be likely to have been altered or corrupted. Such a link 4 which is hidden from some users (but not others) who access the information content item 3 may also be an indicator of the likely alteration or corruption of the information content item 3. Such a link 4 for which text associated with the link 4 does not match the subject matter of the link context 41 may also indicate alteration or corruption. The computer system 1 may be configured (e.g. through the execution of instructions) to perform such analysis using the link context 41.

In some embodiments, the computer system 1 (e.g. through the execution of instructions) may be configured to identify information content items which are likely to be directories of businesses or individuals. This may be achieved by analysis of the link context 41 as described herein (e.g. the structure of the link context 41). In some embodiments, the analysis may be combined with use of categories of subject matter associated with the information content item 3—e.g. an information content item 3 having a structure (as determine through analysis of the link context 4) and being associated with a large number of different subject matter categories may be a directory of a relatively general nature (whilst such an information content item 3 associated with a very particular subject matter category may be a directory targeting that particular subject matter area). The identification of a directory may enable the exclusion of that information content item 3 from one or more further analysis processes or may mean the targeting of that information content item 3 for analysis to extract the information stored therein.

In some embodiments, the computer system 1 may be configured to identify the misuse of information content or the reselling of products. This may be achieved by, for example, the computer system 1 identifying particular information content (such as a brand name or trade mark) within the link context 41 associated with a link 4 which is not an authorised user of that information content (e.g. is not the owner of the brand name or trade mark). Similarly, a product name may be the information content which is identified, in the same manner, in the link context 41. The computer system 1 (e.g. through the execution of instructions) may be configured to receive sample information content on which to base the analysis (e.g. the brand name, trade mark, or product name) and may search one or more link contexts 41 for the presence of the sample information content. In some embodiments, a user may provide the sample information content. In other examples, the computer system 1 may be configured to harvest the sample information content by using a link context 41 or part of a link context 41 associated with one or more links 4 which are authorised (e.g. present in information content items 4 authorised by or under the control of the brand or trade mark owner/licensee or the product manufacturer/seller). The computer system 1 may be configured to generate a report identifying one or more such illegitimate or nefarious information content items 3 and may, for example, then block those information content items 3 from one or more further analysis processes (e.g. by blacklisting them as described herein).

In some embodiments, the computer system 1 may be configured to perform analysis in relation to a business. In particular, the computer system 1 (e.g. by the execution of instructions) may be configured to identify linking information content items 3 for a particular business. The computer system 1 may then use the link context 41 for those links 4 in order to identify one or more other business names within the link context 41. In some instances, this may be an indicator of a business relationship between the businesses. For example, a website development company may list their name and a link to their website a on a customer website alongside a copyright notice listing the name of the customer. Therefore, a business association between the website developer and the customer can be determined. This information may be output in a report to a user, for example.

In some embodiments, the computer system 1 may be configured (e.g. through the execution of instructions) to generate a chart representing the text or link density of all links 4 associated with (i.e. to and/or from) a particular information content item 3 or a group of such items 3 (such as a website). The profile of this chart may provide an overall health assessment of the particular information item 3 or group of such items 3. Accordingly, the computer system 1 may be configured to compare the profile of this chart with one or more sample profiles, wherein each sample profile is associated with an indication of the quality of the links 4 to and/or from the information content item 3. This indication may be presented in terms of a numerical value or a text explanation.

In various embodiments reference is made to the storage of information in a database or in databases which may be stored on the computer readable medium 11. In some embodiments, all or some of this information may be stored in relation to the map or other representation of the network 21 of interlinked nodes 31.

It will be appreciated that a linking information content item 3 which is illegitimate may be an indicator that the linked information content item 3 is also illegitimate and vice versa.

Information Content Item Overview

In some embodiments, the computer system 1 may be configured to provide an overview analysis in relation to an entire or substantially an entire information content item 3 (such as a webpage).

Accordingly, the computer system 1 may be configured to separate the information content item 3 into a plurality of segments. In some embodiments, a predetermined number of segments may be used for all information content items 3. In some embodiments, the number of segments is determined based on the length of the information content item 3 (e.g. the total number of characters or words in the information content item 3)—such that a smaller information content item 3 is separated into fewer segments and a larger information content item 3 is separated into more segments. Segment size may be defined as a number of characters or a number of words, for example. The segments may be of equal size to each other.

In some embodiments, substantially all of an information content item 3 means the main information content carrying part of the information content item 3—which may exclude, for example, one or more parts of the information content item 3 such as a menu or panel or frame. The computer system 1 may, therefore, be configured (e.g. by the execution of instructions) to identify the main information content carrying part of the information content item 3.

In some embodiments, a header, a footer, and a main body of the information content item 3 is separated into segments.

In some embodiments, the information content item 3 may be separated into 10 or more segments, or 20 or more segments, or 30 or more segments, or 40 or more segments. In some embodiments, 40-80 segments may be used and, in some embodiments, 40-50 segments (or about or exactly 40 segments). It has been found that the use of 40-50 segments (and, in particular, about 40 segments) is a particularly good balance between the resolution of the results and the computing resources required to perform the analysis (see below).

The segments may represent sequential blocks of the information content item 3. Therefore, a first segment may be part of the top of an information content item 3 (e.g. the topmost part) and a last segment may be part of the bottom of the information content item 3 (e.g. the bottommost part). In the case of 40 segments, the segments may run from the first segment to the fortieth segment, for example.

The computer system 1 may be further configured (through the execution of instructions) to determine the number of links 4 in each segment of the information content item. In some embodiments, internal and external links 4 are distinguished and counted separately—to produce a count of the total number of internal links 4 and a total number of external links 4 in that segment. The terms "internal links" and "external links" have been used consistently elsewhere herein. Internal links 4 may be links 4 within the same information content item 3 (e.g. webpage) or the same group of information content items (e.g. website). External links 4 may be those links 4 which are not internal links (and so links 4 to a different information content item 3 or group of information content items 3).

Accordingly, the computer system 1 may, for an information content item 3 being analysed, generate a list of segments and, in association with each segment, there may be a count of the number of internal and external links 4 contained therein.

Overlap between segments may be handled in a number of different manners. For example, a link 4 which bridges two segments may be counted twice (once of each segment or may be counted only in relation to the segment in which the first or last part of the link appears. In some embodiments, the segment sizes are adjusted to the nearest complete link 4 such that there are no links 4 which bridge segments.

The link density of each segment may also or alternatively be determined (in the manner described herein).

Accordingly, in some embodiments, the computer system 1 is configured (e.g. through the execution of instructions) to generate—in association with an information content item 3—a sequential list of segments each of which may include an indication of the number of links 4 present in the segment (which may be separated into internal and external links, for example), and each of which may include an indication of the link density of the links 4 present in the segment.

The computer system 1 may be configured to analyse the distribution of the links 4 and/or the link density within the information content item 3. This analysis may include a comparison of a profile of the link density distribution with one or more predetermined template link density distributions. In other words, the computer system may be configured (e.g. through the execution of instructions) to compare the distribution of the link densities for the information content item 3 with one or more predetermined link density distributions. The distribution of the links (internal and/or external) may also be compared to template link distributions in the same manner. The templates may be templates of both link distributions and link density distributions, for example.

The or each predetermined link and/or link density distributions may be representative of the typical link and/or link density distribution of an information content item 3 of a particular type. The particular type may be a particular category of information content item 3 such as a news item, a news distribution item (such as a news website), a social media item, a directory, a catalogue, search engine webpage, an encyclopedia, a travel item (such as a travel related website), a retailer, an auction provider (such as an auction webpage), and the like.

The profile of the link and/or link density distributions may be, for example, the overall shape of the distribution (s)—as might be represented in a line graph and/or bar graph for example.

In some embodiments, the computer system 1 (e.g. through the execution of instructions) may be configured to generate a graphical representation of the link or link density distribution profile associated with the segments (which may include representations of the internal links 4 distinct from the external links 4).

In some embodiments, the graphical representation has an axis representation the segments in sequential order. This axis may be a vertical axis, for example.

In some embodiments, centred symmetrically about this axis there may be two lines representing the link density for each segment—with the distance between the two lines at any point along the axis (the distance being perpendicular to this axis) representing the link density.

In some embodiments, bars may be provided which represent the number of links in each segment. Bars extending to one side of the axis may be representative of the total number of internal links and bars extending from the other side of the axis may be representative of the total number of external links. In some embodiments, the bars on either side of the axis are different colors to aid in interpretation of the graphical representation.

Some example graphical representations are shown in FIGS. 4-17.

Figure 4:
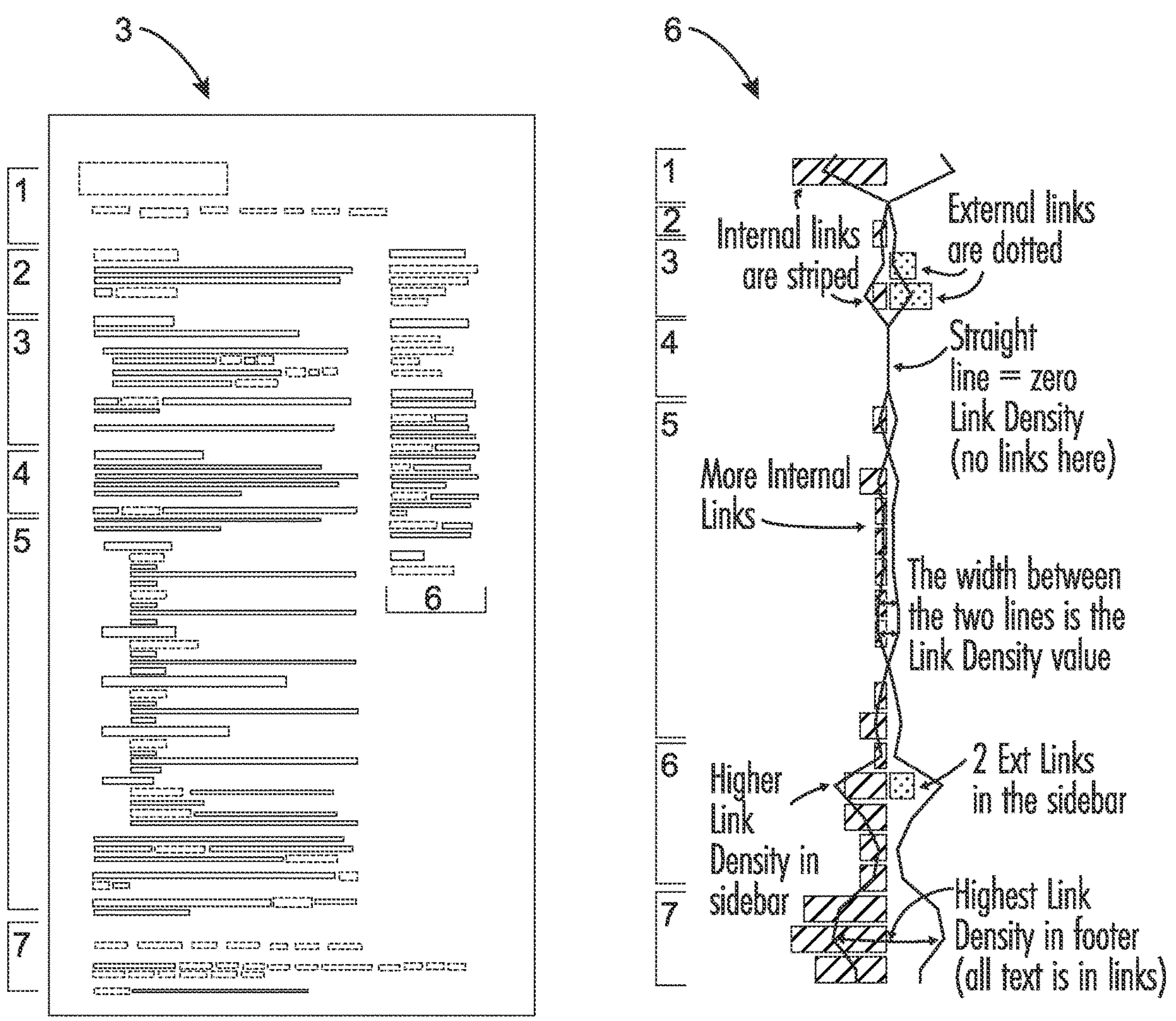
FIGS. 4-17 show or are used to explain graphical representations of the results or partial results of processes performed by embodiments.

In FIG. 4, there is shown an information content item 3 in schematic form. The information content item 3 happens to be a webpage. In the schematic representation of the item 3 in FIG. 4 links are represented by rectangles shown in broken lines and other test is represented by rectangles shown in solid lines. The rectangles may represent one or more words and/or images of the information content item 3.

The information content item 3 is, for the purposes of explanation, separated into seven parts—each of which is numerically labelled (with the section numbers inside a partial rectangular bracket "[" to distinguish from other reference numerals used herein and to identify the relevant parts of the information content item 3 and also the graphical representation. Section 1 is a page header at the top of the code of the information content item 3. Sections 2-5 represent different subtitled sections of the main body of the information content item 3. Section 7 is a page footer at the bottom of the information content item 3. Section 6 is a side panel which is, in the code forming the information content item 3, located between the main body of the information content item 3 and the footer (i.e. between sections 5 and 7).

The aforementioned graphical representation 6 is depicted adjacent the representation of the information content item 3 to aid the explanation herein.

The graphical representation 6 of this (and some other embodiments) may be a representation of the analysis of the code forming the information content item 3 (in the order in which the code appears rather than how this code is interpreted by a display application such as a browser).

As can be seen the graphical representation include section numbering which matches that of the representation of the information content item 3. Internal link numbers for each segment are shown in blue to the left of a vertical axis of the representation. External link numbers for each segment are shown in yellow to the right of the vertical axis. The link density is shown by symmetrical lines about the axis. Other colors and arrangements of representation are possible.

It has been found that a legitimate information content item 3 which is a webpage will often include a high link density in the footer part of the graphical representation—i.e. a bulge in the distance between the two lines representing the link density. This is due to the placement of links to terms and conditions, other parts of the webpage, other language or local variants of the webpage and the like. It has also been found to be common that legitimate webpages will have a high number of internal links indicated in this part of the graphical representation.

Other example graphical representations in relation to other information content items 3 are shown in FIGS. 5-17. These information content items 3 are all webpages in this instance but this need not be the case—as is apparent from the description herein.

Figure 5:
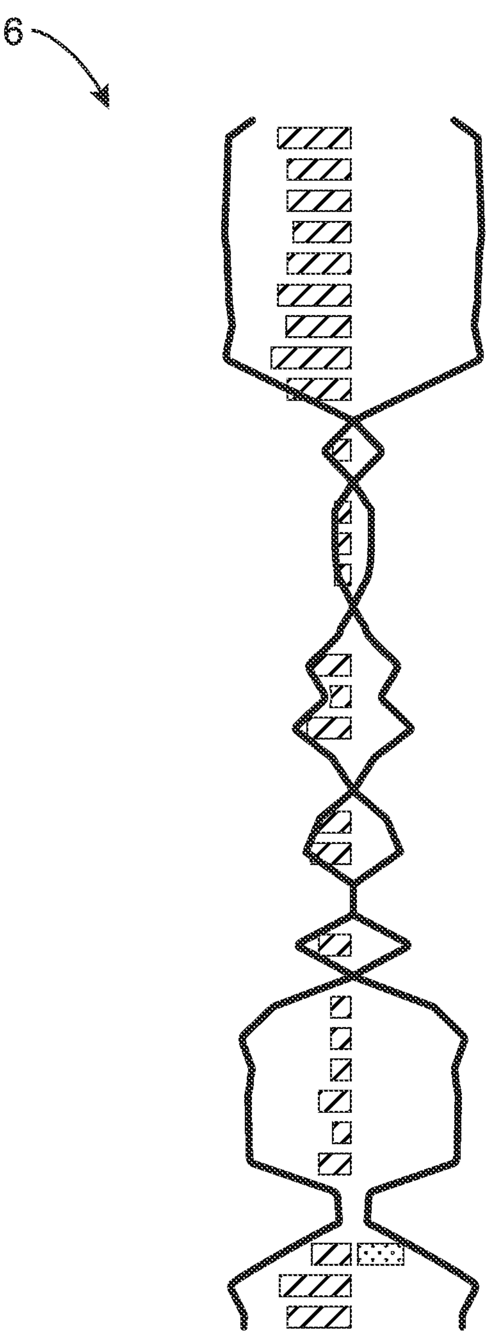

In FIG. 5 the information content item is a webpage for a typical service provider and, in particular, a homepage. The links on the homepage are largely internal to allow for navigation of the rest of the associated website and there is a reasonable distribution for text in the middle portion (i.e. the part with the relatively low link density).

Figure 6:
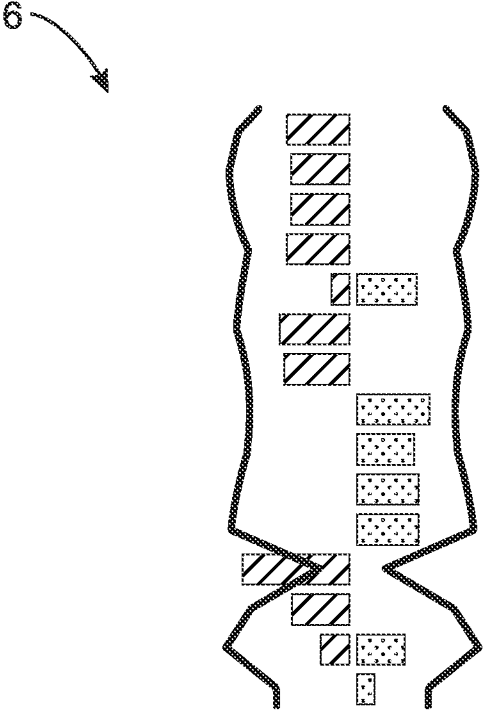

In FIG. 6 the information content item is a webpage with a number of large images and a high number of internal and external links.

Figure 7:
Figure 7:
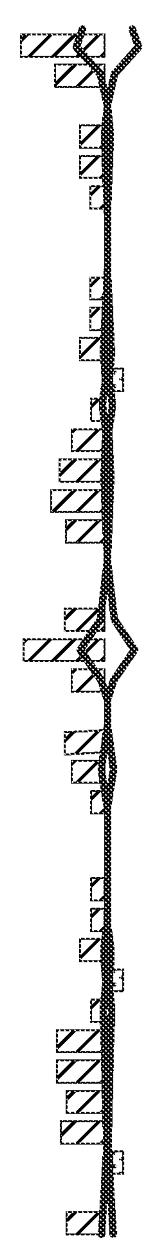

In FIG. 7 the information content item is a webpage for an online payment service provider. There are a large number of internal links on the webpage but the link density is low—meaning that the links are distributed in text rather than in a directory.

Figure 8:
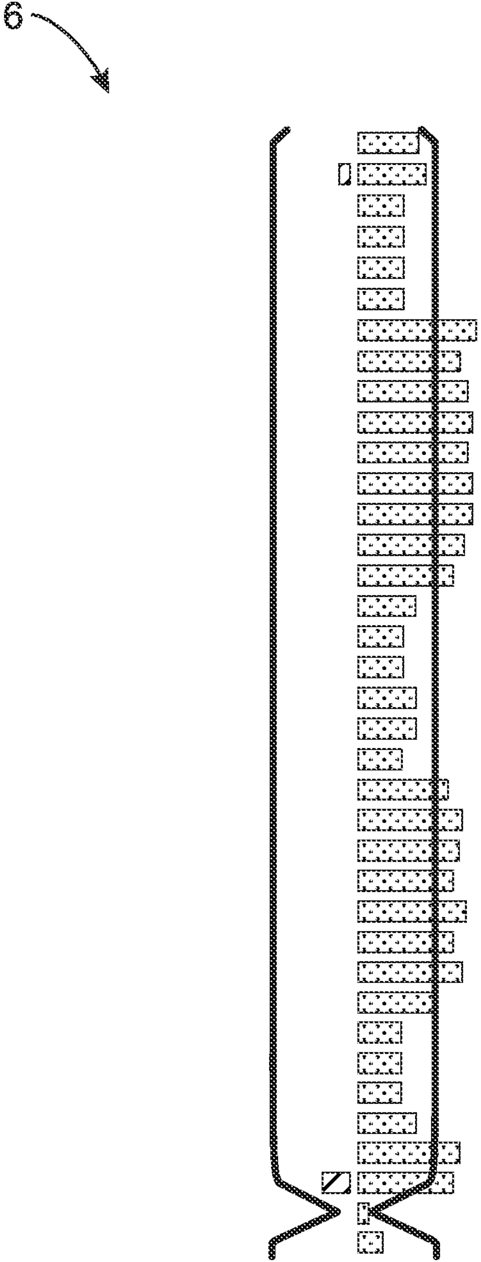

In FIG. 8 the information content item is a webpage in which nearly all the text on the page is in the form of a link, with most of the links being external.

Figure 9:
Figure 9:
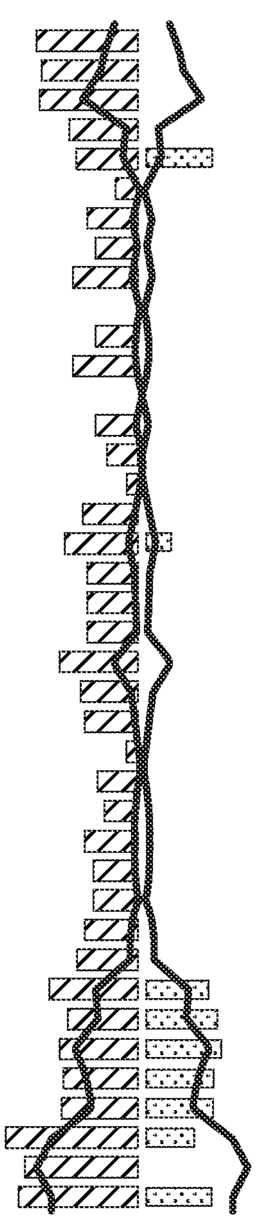

In FIG. 9 the information content item is a webpage from an online encyclopedia. The low link density in the middle of the webpage represents the editorial content and the high link density at the bottom shows the citations for the editorial content.

Figure 10:
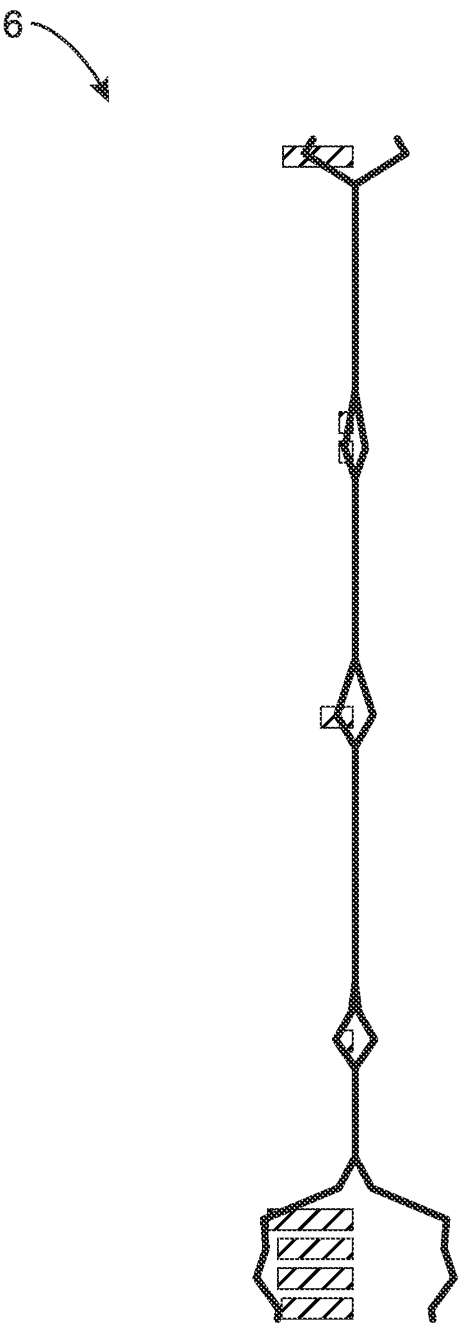

In FIG. 10 the information content item is a webpage of a large technology company. It can be seen that the webpage has few links (mostly in the footer) and a large amount of text content.

Figure 11:
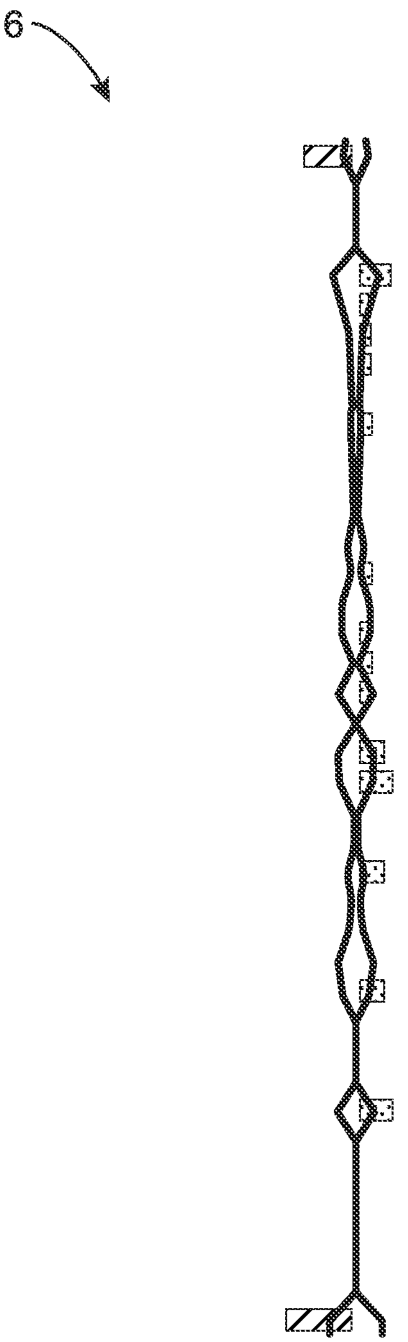

In FIG. 11 the information content item is a webpage of a community-based news and opinion publishing service. There are relatively few links on the page and any are external links to support facts presented on the page.

Figure 12:
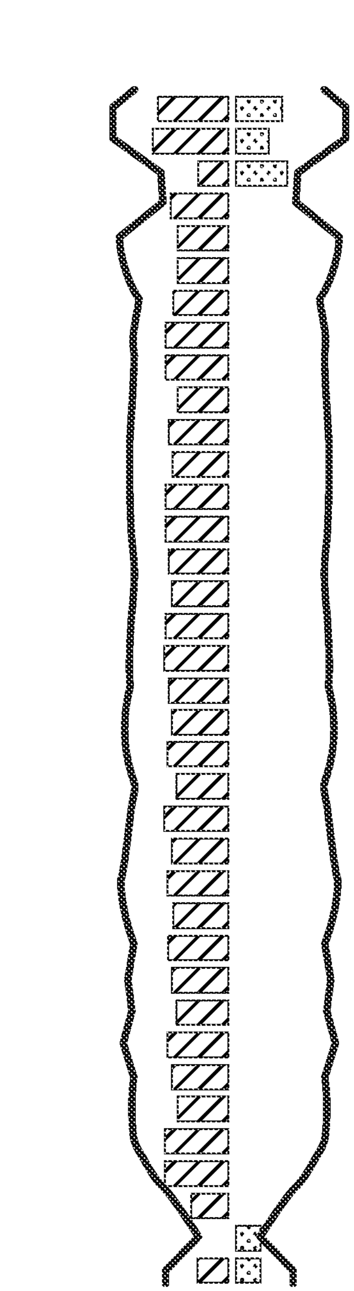

In FIG. 12 the information content item is a webpage for an event with a large number of internal links (each speaker at the event has an separate internally hosted webpage).

Figure 13:
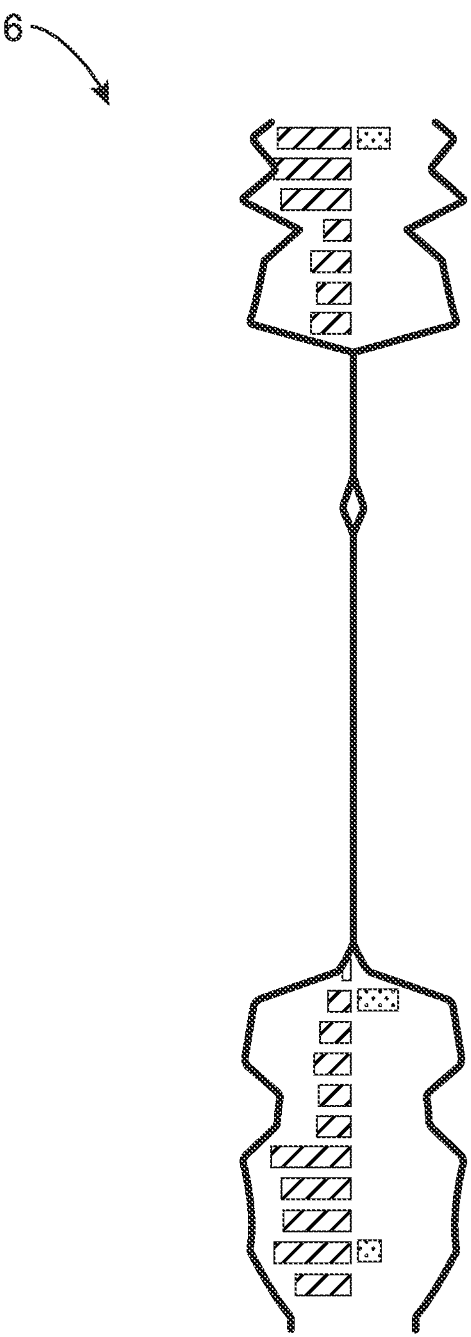

In FIG. 13 the information content item is a webpage of a news service with clear header and footer links but with a large body of editorial content in the middle (largely without links).

Figure 14:
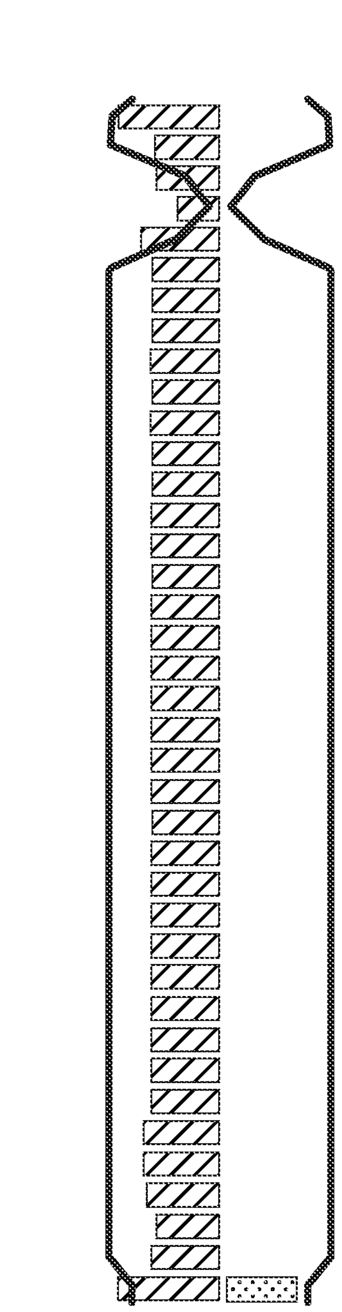

In FIG. 14 the information content item is a webpage of a newspaper and it can be seen that the webpage includes a large number of internal links—with a view to keeping the reader on the website of the newspaper.

Figure 15:
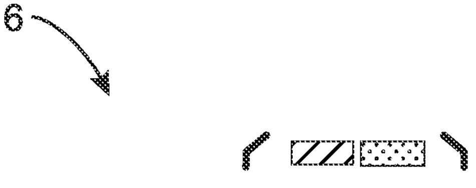

In FIG. 15 the information content item is a webpage (the homepage) of a popular search engine with a simple interface. The content is very limited and so the number of segments is reduced.

Figure 16:
Figure 16:
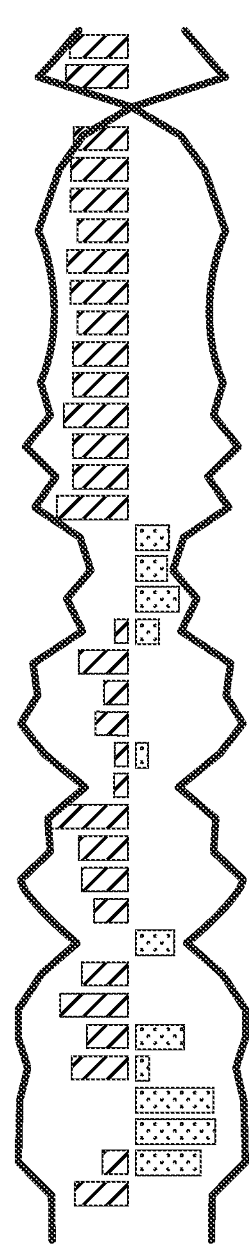

In FIG. 16 the information content item is a webpage (the homepage) of a popular auction site with a large number of images.

Figure 17:
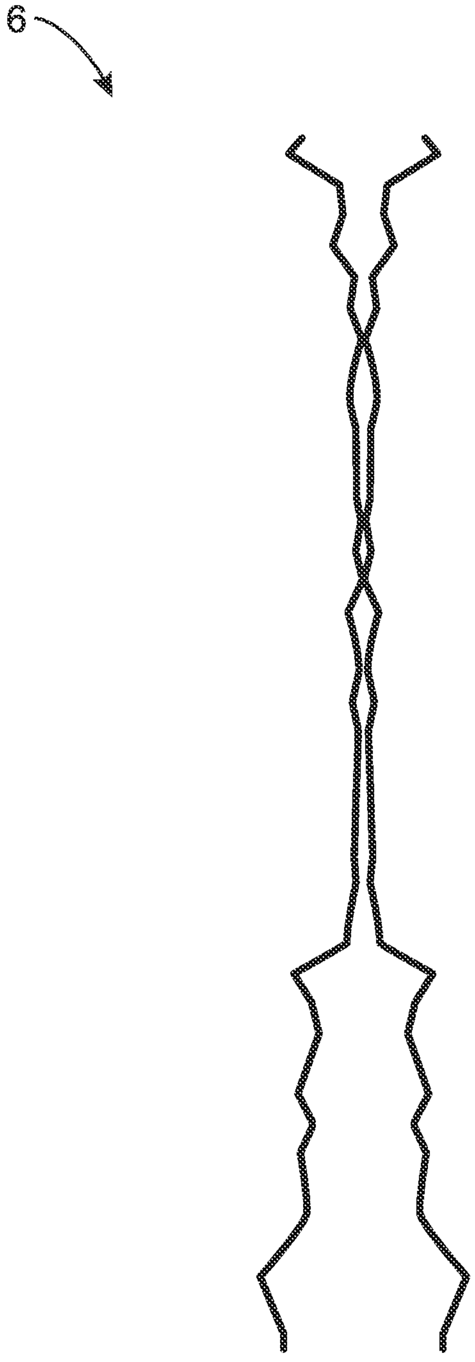

In FIG. 17 is a graphical representation including only the link density and not the number of internal and/or external links.

In some embodiments, the graphical representation may be used to investigate a particular link 4 within an information content item 3. In which case, the graphical representation may include a highlighted segment (e.g. through the use of a rectangular box of a different color) in which that link is located.

Investigation using the graphical representations may be performed by a user or may be automated—e.g. using pattern matching techniques.

As will be appreciated, embodiments may be used to identify (in a non-limiting sense) one or more information content items 3 in which a competitor has a link 4, information content items 3 including mention of a user and a competitor but including (or not) a link 4 to a user's information content item 3 and/or a link 4 (or not) to the competitor's information content item 3, locations of deleted links 4 (using historic data), the context in which links 4 can be found, instances in which a brand name have been used in association with an information content item 3 not relating to the brand owner, nefarious uses of a brand name or webpage, and the like. Embodiments may also be used to classify and categorise information content items 3.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realizing the invention in diverse forms thereof.

Although certain example embodiments of the invention have been described, the scope of the appended claims is not intended to be limited solely to these embodiments. The claims are to be construed literally, purposively, and/or to encompass equivalents.

Aspects

1. A system for determining information in relation to a link in an interlinked set of information content items, the system comprising:

2. a processor and a memory, wherein the memory stores a set of machine-readable instructions operable, when executed by the processor, to:
   - i. receive a link context associated with a link in an information content item of the interlinked set of information content items, the link context including information from the information content item providing context for the link;
   - ii. analyse the link context to identify one or more additional links present in the link context; and
   - iii. determine a link density as the proportion of the link context which includes the or each additional link relative to the size of the link context, and/or determine a text density as the proportion of the link context which does not include the or each additional link relative to the size of the link context and/or count the or each additional link.

3. A system according to aspect 1, wherein the information of the link context includes one or more characters.

4. A system according to aspect 2, wherein the one or more characters are characters which are adjacent the link.

5. A system according to any of aspects 1 to 3, wherein the size of the link context is predetermined and the same size of link context is used in the analysis of a plurality of links.

6. A system according to any of aspects 1 to 3, wherein the size of the link context is determined by separating the information content item in to a predetermined number of segments.

7. A system according to any preceding aspect, wherein the memory further stores a set of machine-readable instructions operable, when executed by the processor, to: display a graphical representation of the link density and/or text density.

8. A system according to any preceding aspect, wherein the memory further stores a set of machine-readable instructions operable, when executed by the processor, to: determine a distribution of link densities within the information content item.

9. A system according to aspect 7, wherein the memory further stores a set of machine-readable instructions operable, when executed by the processor, to: compare the distribution of link densities with one or more predetermined distributions to categorise the information content item.

10. A system for determining information in relation to a link in an interlinked set of information content items, the system comprising:

11. a processor and a memory, wherein the memory stores a set of machine-readable instructions operable, when executed by the processor, to:

i. identify an information content item of the set of information content items;

ii. access the identified information content item;

iii. locate a link within the information content item, the link being a link to another information content item or the same information content item of the interlinked set of information content items;

iv. extract a link context associated with the link and including information from the information content item which provides context for the link; and v. store the extracted link context in association with the link.

10. A system for determining information in relation to a link in an interlinked set of information content items, the system comprising a processor and a memory, wherein the memory stores a set of machine-readable instructions operable, when executed by the processor, to:

i. identify an information content item of the set of information content items;

ii. access the identified information content item;

iii. locate a link within the information content item, the link being a link to another information content item or the same information content item of the interlinked set of information content items;

iv. extract a link context associated with the link and including information from the information content item which provides context for the link; and v. identify one or more additional links within the link context; and vi. determine a link density as the proportion of the link context which includes the or each additional link relative to the size of the link context, and/or determine a text density as the proportion of the link context which does not include the or each additional link relative to the size of the link context, and/or count the or each additional link in the link context.

11. A system for determining information in relation to a link in an interlinked set of information content items, the system comprising:

1. a processor and a memory, wherein the memory stores a set of machine-readable instructions operable, when executed by the processor, to:

i. identify an information content item of the set of information content items;

ii. separate the identified information content item into a plurality of segments; and iii. determine a link density for one or more the plurality of segments, the link density being a proportion of the segment which includes a link relative to the size of the segment, and/or determine a text density, the text density being a proportion of the segment which does not include a link relative to the size of the segment, and/or count the links in the segment.

12. A method for determining information in relation to a link in an interlinked set of information content items, the method comprising:

i. receiving a link context associated with a link in an information content item of the interlinked set of information content items, the link context including information from the information content item providing context for the link;

ii. analyzing the link context to identify one or more additional links present in the link context; and iii. determining a link density as the proportion of the link context which includes the or each additional link relative to the size of the link context, and/or determining a text density as the proportion of the link context which does not include the or each additional link relative to the size of the link context, and/or counting the or each additional link.

13. A method for determining information in relation to a link in an interlinked set of information content items, the method comprising:

i. identifying an information content item of the set of information content items;

ii. accessing the identified information content item;

iii. locating a link within the information content item, the link being a link to another information content item or the same information content item of the interlinked set of information content items;

iv. extracting a link context associated with the link and including information from the information content item which provides context for the link; and v. storing the extracted link context in association with the link.

14. A method for determining information in relation to a link in an interlinked set of information content items, the method comprising:

i. identifying an information content item of the set of information content items;

ii. accessing the identified information content item;

iii. locating a link within the information content item, the link being a link to another information content item or the same information content item of the interlinked set of information content items;

iv. extracting a link context associated with the link and including information from the information content item which provides context for the link;

v. identifying one or more additional links within the link context; and vi. determining a link density as the proportion of the link context which includes the or each additional link relative to the size of the link context, and/or determine a text density as the proportion of the link context which does not include the or each additional link relative to the size of the link context, and/or counting the or each additional link.

15. A method for determining information in relation to a link in an interlinked set of information content items, the method comprising:

i. identifying an information content item of the set of information content items;

ii. separating the identified information content item into a plurality of segments; and iii. determining a link density for one or more the plurality of segments, the link density being a proportion of the segment which includes a link relative to the size of the segment, and/or or determine a text density, the text density being a proportion of the segment which does not include a link relative to the size of the segment, and/or count the links in the segment.

16. A system according to any of aspects 1 to 8 or 10 or 11, wherein the memory further stores a set of machine-readable instructions operable, when executed by the processor, to categorise one or more information content items using the text density and/or link density and/or link count.

17. A system according to any of aspects 1 to 8 or 10 or 11 or 16, wherein the memory further stores a set of machine-readable instructions operable, when executed by the processor, to present a graphical representation of the link density and/or text density, and/or link count 18. A method according to any of aspects 12 or 14 or 15, further including categorizing one or more information content items using the text density and/or link density and/or link count.

19. A method according to any of aspects 12 or 14 or 15 or 18, further including presenting a graphical representation of the link density and/or text density and/or link count.

The invention claimed is:

1. A system for determining information in relation to a link in an interlinked set of information content items, the system comprising:

a processor and a memory, wherein the memory stores a set of machine readable instructions operable, when executed by the processor, to:

receive a link context associated with a link in a first information content item of the interlinked set of information content items, the link context including a predetermined amount of information from the first information content item positioned before and/or after the link relative to a logical storage of coding that forms the first information content item;

analyze the link context to identify one or more additional links present in the link context;

determine a link density as the proportion of the link context which includes the each additional link relative to the size of the link context, and/or determine a text density as the proportion of the link context which does not include the each additional link relative to the size of the link context and/or count the each additional link;

receive an indication of a target information content item from a user via a graphical user interface, wherein the target information content item is linked by the link in the first information content item; and present, based on one or more of the coding that forms the first information content item and a graphical representation of the coding in the order in which the coding appears, in the graphical user interface, the link context and information based on the determined link density and/or text density, wherein the same amount of information from the information content item is used in the analysis of a plurality of links, and wherein the amount of information is predetermined independently of the information content item.

2. The system of claim 1, wherein the instructions operable to analyze the link context to identify one or more additional links present in the link context include instructions to analyze the link context based on the coding that forms the first information content item in the order in which the coding appears to identify one or more additional links present in the link context.

3. The system of claim 1, wherein the memory further stores a set of machine-readable instructions operable, when executed by the processor, to: display a graphical representation of the link density and/or text density as the information based on the determined link density and/or text density.

4. The system of claim 1, wherein the memory further stores a set of machine-readable instructions operable, when executed by the processor, to display information about one or more of:

how the link density is determined, how the text density are determined, and/or how the each additional link is counted in the first information content item.

5. The system of claim 1, wherein the memory further stores a set of machine-readable instructions operable, when executed by the processor, to determine a distribution of link densities within the first information content item.

6. The system of claim 5, wherein the memory further stores a set of machine-readable instructions operable, when executed by the processor, to compare the distribution of link densities with one or more predetermined distributions to categorize the first information content item.

7. A system for determining information in relation to a link in an interlinked set of information content items, the system comprising:

a processor and a memory, wherein the memory stores a set of machine-readable instructions operable, when executed by the processor, to:

generate a map of the set of information content items;

identify a first information content item of the set of information content items;

access the first information content item;

locate a link within the first information content item, the link being a link to a target information content item of the interlinked set of information content items;

extract a link context associated with the link and including information from the first information content item which provides context for the link;

store the extracted link context in association with the link;

analyze the link context to identify one or more additional links present in the link context;

determine a link density as the proportion of the link context which includes the each additional link relative to the size of the link context, and/or determine a text density as the proportion of the link context which does not include the each additional link relative to the size of the link context and/or count the each additional link; and present, based on one or more of coding that forms the first information content item and a graphical representation of the coding in the order in which the coding appears, in a graphical user interface, in relation to the target information content item, the link context from the first information content item and information based on the determined link density and/or text density, wherein the same amount of information from the information content item is used in the analysis of a plurality of links, and wherein the amount of information is predetermined independently of the information content item.

8. The system of claim 7, wherein the instructions operable to analyze the link context to identify one or more additional links present in the link context include instructions to analyze the link context based on the coding that forms the first information content item in the order in which the coding appears to identify one or more additional links present in the link context.

9. The system of claim 7, wherein the memory further stores a set of machine-readable instructions operable, when executed by the processor, to:

display a graphical representation of the link density and/or text density.

10. The system of claim 7, wherein the memory further stores a set of machine-readable instructions operable, when executed by the processor, to display information about one or more of:

how the link density is determined, how the text density are determined, and/or how the each additional link is counted in the first information content item.

11. The system of claim 7, wherein the memory further stores a set of machine-readable instructions operable, when executed by the processor, to:

determine a distribution of link densities within the first information content item; and compare the distribution of link densities with one or more predetermined distributions to categorize the first information content item.

12. A computer-implemented method for determining information in relation to a link in an interlinked set of webpages, the method comprising:

receiving a link context associated with a link in a first webpage of the interlinked set of webpages, the link including a location of a second webpage of the interlinked set of webpages, the link context including a predetermined amount of information from the first webpage positioned before and/or after the link relative to a logical storage of coding that forms the first webpages;

analyzing the link context to identify one or more additional links present in the link context, the one or more additional links each including one or more locations of corresponding webpages;

determining a link density as the proportion of the link context which includes the each additional link relative to the size of the link context, and/or determine a text density as the proportion of the link context which does not include the each additional link relative to the size of the link context and/or count the each additional link; and presenting, based on one or more of the coding that forms the first webpage and a graphical representation of the coding in the order in which the coding appears, in a graphical user interface, in relation to the second webpage, the link context from the first webpage and information based on the determined link density and/or text density, wherein the same amount of information from the information content item is used in the analysis of a plurality of links, and wherein the amount of information is predetermined independently of the first webpage.

13. The method of claim 12, wherein analyzing the link context to identify one or more additional links present in the link context includes analyzing the link context based on the coding that forms the first webpage in the order in which the coding appears to identify one or more additional links present in the link context.

14. The method of claim 12, further comprising displaying a graphical representation of the link density and/or text density as the information based on the determined link density and/or text density.

* * * * *